(12) United States Patent
Sasata et al.

(10) Patent No.: US 12,306,375 B2
(45) Date of Patent: May 20, 2025

(54) METHOD OF MANUFACTURING OPTICAL ELEMENT

(71) Applicant: FUJIFILM Corporation, Tokyo (JP)

(72) Inventors: Katsumi Sasata, Minamiashigara (JP); Akiko Watano, Minamiashigara (JP); Hiroshi Sato, Minamiashigara (JP); Yukito Saitoh, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 568 days.

(21) Appl. No.: 17/704,066

(22) Filed: Mar. 25, 2022

(65) Prior Publication Data
US 2022/0214476 A1    Jul. 7, 2022

Related U.S. Application Data

(63) Continuation of application No. PCT/JP2020/036318, filed on Sep. 25, 2020.

(30) Foreign Application Priority Data

Sep. 27, 2019 (JP) .................... 2019-176735

(51) Int. Cl.
*G02F 1/13* (2006.01)
*G02B 1/11* (2015.01)
(Continued)

(52) U.S. Cl.
CPC .............. *G02B 1/11* (2013.01); *G02B 1/113* (2013.01); *G02B 5/003* (2013.01); *G02B 5/26* (2013.01)

(58) Field of Classification Search
CPC .......... G02B 1/11; G02B 1/113; G02B 5/003; G02B 5/26
See application file for complete search history.

(56) References Cited

U.S. PATENT DOCUMENTS

2010/0265437 A1* 10/2010 Sato ................... G02F 1/133528
349/96
2018/0039141 A1    2/2018 Tseng et al.
(Continued)

FOREIGN PATENT DOCUMENTS

CN          109917547 A  *  6/2019   ............. G02F 1/13
WO    WO 2019/131966 A1    7/2019

OTHER PUBLICATIONS

English Machine Translation of Zhang et al, CN 109 917 547 (Year: 2024).*

(Continued)

*Primary Examiner* — Donald L Raleigh
(74) *Attorney, Agent, or Firm* — Birch, Stewart, Kolasch & Birch, LLP

(57) ABSTRACT

Provided is a method of manufacturing an optical element in which aligning properties of an alignment pattern in a photo-alignment film is improved such that alignment defects of a liquid crystal compound in a liquid crystal layer can be suppressed. The method of manufacturing an optical element includes: an exposure step of performing interference exposure to a surface of a photo-alignment film including a photo-alignment material to form, on the photo-alignment film, an alignment pattern in which a direction of an optical axis derived from a liquid crystal compound changes while continuously rotating in at least one in-plane direction; and a liquid crystal layer forming step of applying a liquid crystal composition including a liquid crystal compound to the photo-alignment film where the alignment pattern is formed to form a liquid crystal layer, in which the photo-alignment material includes an azo compound, and the exposure step is performed in an environment having a relative humidity of 50% or less.

2 Claims, 5 Drawing Sheets

(51) Int. Cl.
G02B 1/113 (2015.01)
G02B 5/00 (2006.01)
G02B 5/26 (2006.01)

(56) References Cited

U.S. PATENT DOCUMENTS

2018/0164645 A1* 6/2018 Oh ..................... G02B 27/017
2020/0326579 A1 10/2020 Sato et al.

OTHER PUBLICATIONS

Japanese Decision of Refusal for corresponding Japanese Application No. 2021-549055, dated Aug. 1, 2023, with an English translation.
Japanese Office Action for corresponding Japanese Application No. 2021-549055, dated Mar. 22, 2023, with English translation.
International Preliminary Report on Patentability and Written Opinion of the International Searching Authority (Forms PCT/IB/326, PCT/IB/373, and PCT/ISA/237) for International Application No. PCT/JP2020/036318, dated Apr. 7, 2022, with an English translation.
International Search Report (Form PCT/ISA/210) for International Application No. PCT/JP2020/036318, dated Dec. 1, 2020, with an English translation.

* cited by examiner

METHOD OF MANUFACTURING OPTICAL ELEMENT

CROSS-REFERENCE TO RELATED APPLICATIONS

This application is a Continuation of PCT International Application No. PCT/JP2020/036318 filed on Sep. 25, 2020, which claims priority under 35 U.S.C. § 119(a) to Japanese Patent Application No. 2019-176735 filed on Sep. 27, 2019. The above application is hereby expressly incorporated by reference, in its entirety, into the present application.

BACKGROUND OF THE INVENTION

1. Field of the Invention

The present invention relates to a method of manufacturing an optical element.

2. Description of the Related Art

An optical element including a liquid crystal layer that is formed of a liquid crystal composition including a liquid crystal compound is used as various optical elements such as a diffraction element or an optically-anisotropic layer.

For example, WO2019/131966A describes an optical element comprising a plurality of cholesteric liquid crystal layers that are laminated, the cholesteric liquid crystal layers being obtained by immobilizing a cholesteric liquid crystalline phase, in which the plurality of cholesteric liquid crystal layers have different selective reflection center wavelengths, the cholesteric liquid crystal layer has a liquid crystal alignment pattern in which a direction of an optical axis derived from a liquid crystal compound changes while continuously rotating in at least one in-plane direction, and in a case where, in the liquid crystal alignment pattern of the cholesteric liquid crystal layer, a length over which the direction of the optical axis derived from the liquid crystal compound rotates by 180° in the in-plane direction in which the direction of the optical axis derived from the liquid crystal compound changes while continuously rotating is set as a single period, a permutation of lengths of the selective reflection center wavelengths and a permutation of lengths of the single periods match each other in the plurality of cholesteric liquid crystal layers having different selective reflection center wavelengths.

As the method of manufacturing a cholesteric liquid crystal layer having a liquid crystal alignment pattern in which a direction of an optical axis derived from a liquid crystal compound changes while continuously rotating in at least one in-plane direction, a method of exposing a photo-alignment film to interference light to form an alignment pattern where an alignment state changes periodically and applying a liquid crystal composition to the photo-alignment film having the alignment pattern to form a cholesteric liquid crystal layer is described.

SUMMARY OF THE INVENTION

An acoustic wave diagnostic apparatus according to an aspect of the present invention comprises in a case where a cholesteric liquid crystal layer is formed using the method of manufacturing a cholesteric liquid crystal layer described in WO2019/131966A, alignment defects of the liquid crystal compound in the cholesteric liquid crystal layer may occur.

According to an investigation by the present inventors, it was found that the alignment defects of the liquid crystal compound in the cholesteric liquid crystal layer occur due to a region where an ability to align the liquid crystal compound (hereinafter, also referred to as "aligning properties") in the alignment pattern of the photo-alignment film is not sufficient. On the other hand, the present inventors investigated a configuration of increasing the exposure amount during exposure of a photo-alignment film in order to improve the aligning properties of the alignment pattern in the photo-alignment film. In this case, however, there may be a case where the aligning properties cannot be sufficiently improved.

An object of the present invention is to solve the problems in the related art and to provide a method of manufacturing an optical element in which aligning properties of an alignment pattern in a photo-alignment film is improved such that alignment defects of a liquid crystal compound in a liquid crystal layer can be suppressed.

In order to achieve the object, the present invention has the following configurations.

[1] A method of manufacturing an optical element, the method comprising:
an exposure step of performing interference exposure to a surface of a photo-alignment film including a photo-alignment material to form, on the photo-alignment film, an alignment pattern in which a direction of an optical axis derived from a liquid crystal compound changes while continuously rotating in at least one in-plane direction; and
a liquid crystal layer forming step of applying a liquid crystal composition including a liquid crystal compound to the photo-alignment film where the alignment pattern is formed to form a liquid crystal layer,
in which the photo-alignment material includes an azo compound, and
the exposure step is performed in an environment having a relative humidity of 50% or less.

[2] The method of manufacturing an optical element according to [1], further comprising:
a peeling step of peeling off the liquid crystal layer formed in the liquid crystal layer forming step from the photo-alignment film,
in which the liquid crystal layer is formed by performing the liquid crystal layer forming step again after the peeling step.

[3] The method of manufacturing an optical element according to [1] or [2],
in which a relative humidity in an atmospheric environment between the exposure step and the liquid crystal layer forming step is 50% or less.

[4] The method of manufacturing an optical element according to any one of [1] to [3],
in which a relative humidity in an atmospheric environment between the peeling step and the liquid crystal layer forming step is 50% or less.

According to an aspect of the present invention, it is possible to provide a method of manufacturing an optical element in which aligning properties of an alignment pattern in a photo-alignment film is improved such that alignment defects of a liquid crystal compound in a liquid crystal layer can be suppressed.

DESCRIPTION OF THE PREFERRED EMBODIMENTS

Hereinafter, a method of manufacturing an optical element according to an embodiment of the present invention will be described in detail based on preferable embodiments shown in the accompanying drawings.

In the present invention, numerical ranges represented by "to" include numerical values before and after "to" as lower limit values and upper limit values.

In this present invention, "(meth)acrylate" represents "either or both of acrylate and methacrylate".

[Optical Element]

First, an optical element prepared using the method of manufacturing an optical element according to the embodiment of the present invention (hereinafter, also referred to as "the manufacturing method according to the embodiment of the present invention") will be described using the drawings.

Figure 1:
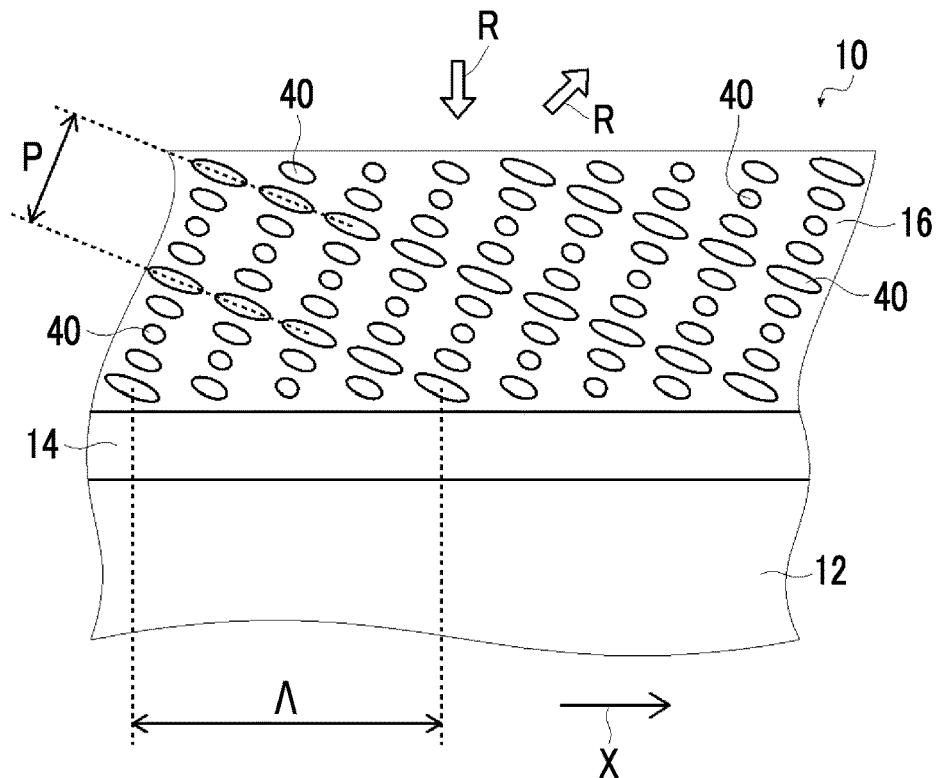
FIG. 1 is a diagram conceptually showing an example of an optical element prepared using a method of manufacturing an optical element according to the present invention.

FIG. 1 is a diagram conceptually showing an example of the optical element prepared using the manufacturing method according to the present invention.

An optical element 10 shown in FIG. 1 includes a support 12, a photo-alignment film 14, and a cholesteric liquid crystal layer 16.

The cholesteric liquid crystal layer 16 is obtained by immobilizing a cholesteric liquid crystalline phase. In the present invention, the cholesteric liquid crystal layer 16 has a liquid crystal alignment pattern in which a direction of an optical axis 40A derived from a liquid crystal compound 40 changes while continuously rotating in at least one in-plane direction (refer to FIG. 2).

Figure 3:
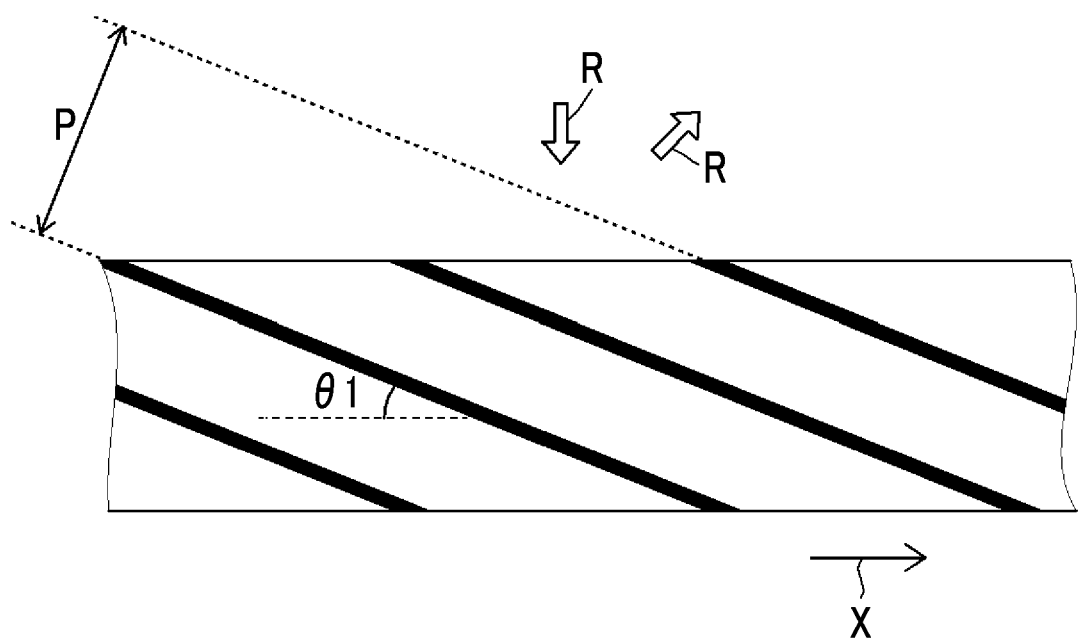
FIG. 3 is a diagram conceptually showing a cross-sectional SEM image of the cholesteric liquid crystal layer shown in FIG. 1.

In addition, in a cross-section of the cholesteric liquid crystal layer 16 observed with a scanning electron microscope (SEM), bright portions and dark portions derived from a cholesteric liquid crystalline phase are tilted with respect to a main surface (refer to FIG. 3). The main surface is the maximum surface of a sheet-shaped material (for example, a film or a plate-shaped material).

<Support>

In the optical element 10, the support 12 supports the photo-alignment film 14 and the cholesteric liquid crystal layer 16.

As the support 12, various sheet-shaped materials can be used as long as they can support the photo-alignment film 14 and the cholesteric liquid crystal layer 16.

A transmittance of the support 12 with respect to corresponding light is preferably 50% or more, more preferably 70% or more, and still more preferably 85% or more.

The thickness of the support 12 is not particularly limited and may be appropriately set depending on the use of the optical element 10, flexibility or rigidity required for the optical element 10, a difference in thickness required for the optical element 10, and a material for forming the support 12, and the like in a range where the photo-alignment film 14 and the cholesteric liquid crystal layer can be supported.

The thickness of the support 12 is preferably 1 to 1000 μm, more preferably 3 to 250 μm, and still more preferably 5 to 150 μm.

The support 12 may have a monolayer structure or a multi-layer structure.

In a case where the support 12 has a monolayer structure, examples thereof include supports 12 formed of glass, triacetyl cellulose (TAC), polyethylene terephthalate (PET), polycarbonates, polyvinyl chloride, acryl, polyolefin, and the like. In a case where the support 12 has a multi-layer structure, examples thereof include a support including: one of the above-described supports having a monolayer structure that is provided as a substrate; and another layer that is provided on a surface of the substrate.

<Photo-Alignment Film>

In the optical element 10, the photo-alignment film 14 is formed on a surface of the support 12.

The photo-alignment film 14 is an alignment film for aligning the liquid crystal compound 40 to a predetermined liquid crystal alignment pattern during the formation of the cholesteric liquid crystal layer 16.

Although described below, the cholesteric liquid crystal layer 16 according to the embodiment of the present invention has a liquid crystal alignment pattern in which a direction of an optical axis 40A (refer to FIG. 2) derived from the liquid crystal compound 40 changes while continuously rotating in one in-plane direction. Accordingly, the photo-alignment film 14 is formed such that the cholesteric liquid crystal layer 16 can form the liquid crystal alignment pattern.

In the following description, "the direction of the optical axis 40A rotates" will also be simply referred to as "the optical axis 40A rotates".

The photo-alignment film 14 is a so-called a photo-alignment film obtained by irradiating (exposing) a photo-alignment material with light. That is, the photo-alignment film 14 is a photo-alignment film that is formed by applying a photo-alignment material to the support 12 and exposing the applied photo-alignment material.

The photo-alignment material used in the photo-alignment film that can be used in the present invention includes an azo compound.

The azo compound is a compound having an azo group (—N=N—).

Examples of the azo compound include azo compounds described in JP2006-285197A, JP2007-76839A, JP2007-138138A, JP2007-94071A, JP2007-121721A, JP2007-140465A, JP2007-156439A, JP2007-133184A, JP2009-109831A, JP3883848B, and JP4151746B.

As the azo compound, a compound that has a photoreactive group having an azo group (—N=N—) is preferable.

Examples of the photoreactive group having an azo group include an azobenzene group, an azonaphthalene group, an aromatic heterocyclic azo group, a bisazo group, and a formazan group.

These groups may further have a substituent. Examples of the substituent include an alkyl group, an alkoxy group, an aryl group, an allyloxy group, a cyano group, an alkoxycarbonyl group, a hydroxyl group, a carboxyl group or a salt thereof, a sulfo group or a salt thereof, a halogenated alkylene group, and a group including a combination thereof.

As the azo compound, a compound represented by Formula (I) is preferable.

Formula (I)

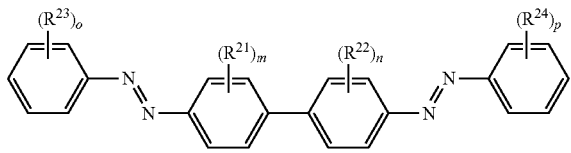

$R^{21}$ to $R^{24}$ each independently represent a hydrogen atom or a substituent. In this case, at least one of the groups represented by $R^{21}$ to $R^{24}$ is a carboxyl group or a salt thereof or a sulfo group or a salt thereof, m represents an integer of 1 to 4, n represents an integer of 1 to 4, o represents an integer of 1 to 5, and p represents an integer of 1 to 5. In a case where m, n, o, and p represent an integer of 2 or more, a plurality of $R^{21}$'s to $R^{24}$'s may be the same as or different from each other.

Examples of the substituent represented by each of $R^{21}$ to $R^{24}$ in Formula (I) include a carboxyl group or a salt thereof (examples of the salt of the carboxyl group include a salt of alkali metal, and a sodium salt is preferable), a sulfo group or a salt thereof (examples of the salt of the sulfo group include a salt of alkali metal, and a sodium salt is preferable), an alkyl group, an alkenyl group, an alkynyl group, an aryl group, a substituted or unsubstituted amino group, an alkoxy group, an alkoxycarbonyl group, an acyloxy group, an acylamino group, an alkoxycarbonylamino group, an aryloxycarbonylamino group, a sulfonylamino group, a sulfamoyl group, a carbamoyl group, an alkylthio group, an arylthio group, a sulfonyl group, a sulfinyl group, an ureido group, a phosphoric amide group, a hydroxy group, a mercapto group, a halogen atom, a cyano group, a nitro group, a hydroxamic acid group, a sulfino group, a hydrazino group, an imino group, a heterocyclic group, and a silyl group.

The substituents may be further substituted with the substituents. In addition, in a case where two or more substituents are present, the substituents may be the same as or different from each other. In addition, if possible, the substituents may be bonded to each other to form a ring.

As the group represented by $R^{21}$ to $R^{24}$ in Formula (I), a hydrogen atom, a carboxyl group or a salt thereof, a sulfo group or a salt thereof, a halogen atom, an alkyl group, an alkoxy group, a cyano group, a nitro group, an alkoxycarbonyl group, or a carbamoyl group is preferable, a hydrogen atom, a carboxyl group or a salt thereof, a sulfo group or a salt thereof, a halogen atom, a methyl halide group, a methoxy halide group, a cyano group, a nitro group, or a methoxycarbonyl group is more preferable, and a hydrogen atom, a carboxyl group or a salt thereof, a sulfo group or a salt thereof, a halogen atom, a cyano group, or a nitro group is still more preferable.

In this case, at least one of the groups represented by $R^{21}$ to $R^{24}$ is a carboxyl group or a salt thereof or a sulfo group or a salt thereof. The substitution site of the carboxyl group or a salt thereof or the sulfo group or a salt thereof is not particularly limited. From the viewpoint of photoactivity, it is preferable that at least one $R^{21}$ and/or at least one $R^{22}$ represents a sulfo group or a salt thereof, and it is more preferable that at least one $R^{21}$ and at least one $R^{22}$ represent a sulfo group or a salt thereof. In addition, from the same viewpoint, it is preferable that at least one $R^{23}$ and/or at least one $R^{24}$ represents a carboxyl group or a salt thereof, and it is more preferable that at least one $R^{23}$ and at least one $R^{24}$ represent a carboxyl group or a salt thereof. It is still more preferable that the carboxyl group or a salt thereof is $R^{23}$ and $R^{24}$ substituted at the meta position with respect to the azo group.

In Formula (I), m represents an integer of 1 to 4, n represents an integer of 1 to 4, o represents an integer of 1 to 5, and p represents an integer of 1 to 5. It is preferable that m represents an integer of 1 to 2, n represents an integer of 1 to 2, o represents an integer of 1 to 2, and p represents an integer of 1 to 2.

Hereinafter, specific examples of the compound represented by Formula (I) will be shown, but the present invention is not limited to the following specific examples.

| No. | $R^1$ | $R^2$ | $R^3$ | $R^4$ |
|---|---|---|---|---|
| E-1 | —SO$_3$Na | —H | —COOH | —OH |
| E-2 | —H | —SO$_3$Na | —COOH | —OH |
| E-3 | —SO$_3$Na | —H | —COONa | —OH |
| E-4 | —H | —SO$_3$Na | —COONa | —OH |
| E-5 | —CH$_3$ | —H | —COONa | —OH |
| E-6 | —H | —CH$_3$ | —COONa | —OH |
| E-7 | —H | —OCH$_3$ | —COONa | —OH |
| E-8 | —H | —OCF$_3$ | —COONa | —OH |
| E-9 | —H | —Cl | —COONa | —OH |
| E-10 | —H | —CN | —COONa | —OH |
| E-11 | —H | —NO$_2$ | —COONa | —OH |

-continued

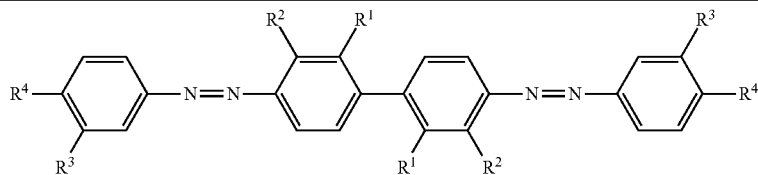

| No. | R¹ | R² | R³ | R⁴ |
|---|---|---|---|---|
| E-12 | —COOCH₃ | —H | —COONa | —OH |
| E-13 | —CONH₂ | —H | —COONa | —OH |
| E-14 | —SO₂NH₂ | —H | —COONa | —OH |
| E-15 | —SO₃Na | —H | —COONa | —OH |
| E-16 | —SO₃Na | —H | —CH₂OH | —OH |
| E-17 | —H | —SO₃Na | —CH₂OH | —OH |

The thickness of the photo-alignment film 14 is not particularly limited. The thickness with which a required alignment function can be obtained may be appropriately set depending on the material for forming the photo-alignment film 14.

The thickness of the photo-alignment film 14 is preferably 0.005 to 5 μm and more preferably 0.01 to 2 μm.

The method of forming the photo-alignment film 14 will be described in detail.

<Cholesteric Liquid Crystal Layer>

In the optical element 10, the cholesteric liquid crystal layer 16 is formed on a surface of the photo-alignment film 14.

The cholesteric liquid crystal layer 16 is obtained by immobilizing a cholesteric liquid crystalline phase. That is, the cholesteric liquid crystal layer 16 is a layer formed of the liquid crystal compound 40 (liquid crystal material) having a cholesteric structure.

The cholesteric liquid crystal layer has a helical structure in which the liquid crystal compound 40 is helically turned and laminated obtained by immobilizing a typical cholesteric liquid crystalline phase. In the helical structure, a configuration in which the liquid crystal compound 40 is helically turned once (rotated by 360) and laminated is set as one helical pitch, and plural pitches of the helically turned liquid crystal compound 40 are laminated. That is, one helical pitch is a pitch P shown in FIG. 1.

In other words, one helical pitch refers to the length of one helical winding, that is, the length in a helical axis direction in which a director (in a rod-like liquid crystal, a major axis direction) of the liquid crystal compound constituting the cholesteric liquid crystalline phase rotates by 360°.

Here, in a cross-section of the cholesteric liquid crystal layer observed with a SEM, a stripe pattern including bright portions (bright lines) and dark portions (dark lines) derived from the cholesteric liquid crystalline phase is observed. That is, in the cross-section of the cholesteric liquid crystal layer, a layered structure in which the bright portions and the dark portions are alternately laminated in the thickness direction is observed.

In the cholesteric liquid crystalline phase, a structure in which the bright portion and the dark portion are repeated twice corresponds to one helical pitch. The structure in which the bright portion B and the dark portion D are repeated twice includes three dark portions (bright portions) and two bright portions (dark portions) (refer to FIG. 3). Therefore, one helical pitch (pitch P) of the cholesteric liquid crystal layer, that is, the reflective layer can be measured from a SEM cross-sectional view.

<<Cholesteric Liquid Crystalline Phase>>

It is known that the cholesteric liquid crystalline phase exhibits selective reflectivity at a specific wavelength.

A center wavelength of selective reflection (selective reflection center wavelength) λ of a general cholesteric liquid crystalline phase depends on the length (pitch P, refer to FIGS. 1 and 3) of one helical pitch in the cholesteric liquid crystalline phase and satisfies a relationship of λ=n×P with an average refractive index n of the cholesteric liquid crystalline phase. Therefore, the selective reflection center wavelength can be adjusted by adjusting the helical pitch.

The selective reflection center wavelength of the cholesteric liquid crystalline phase increases as the pitch P increases.

The helical pitch of the cholesteric liquid crystalline phase depends on the kind of the chiral agent used together with the liquid crystal compound and the concentration of the chiral agent added during the formation of the cholesteric liquid crystal layer. Therefore, a desired helical pitch can be obtained by adjusting these conditions.

The details of the adjustment of the pitch can be found in "Fuji Film Research & Development" No. 50 (2005), p. 60 to 63. As a method of measuring a helical sense and a helical pitch, a method described in "Introduction to Experimental Liquid Crystal Chemistry", (the Japanese Liquid Crystal Society, 2007, Sigma Publishing Co., Ltd.), p. 46, and "Liquid Crystal Handbook" (the Editing Committee of Liquid Crystal Handbook, Maruzen Publishing Co., Ltd.), p. 196 can be used.

The cholesteric liquid crystalline phase exhibits selective reflectivity with respect to left or circularly polarized light at a specific wavelength. Whether or not the reflected light is right circularly polarized light or left circularly polarized light is determined depending on a helical twisted direction (sense) of the cholesteric liquid crystalline phase. Regarding the selective reflection of the circularly polarized light by the cholesteric liquid crystalline phase, in a case where the helical twisted direction of the cholesteric liquid crystal layer is right, right circularly polarized light is reflected, and in a case where the helical twisted direction of the cholesteric liquid crystal layer is left, left circularly polarized light is reflected.

The cholesteric liquid crystal layer 16 shown in FIG. 1 has a right helical twisted direction, and thus reflects right circularly polarized light in a selective wavelength range.

A twisted direction of the cholesteric liquid crystalline phase can be adjusted by adjusting the kind of the liquid crystal compound that forms the cholesteric liquid crystal layer and/or the kind of the chiral agent to be added.

In addition, a half-width Δλ (nm) of a selective reflection wavelength range (circularly polarized light reflection wavelength range) where selective reflection is exhibited depends on Δn of the cholesteric liquid crystalline phase and the helical pitch P and complies with a relationship of Δλ=Δn×P. Therefore, the width of the selective reflection wavelength range can be controlled by adjusting Δn. Δn can be adjusted by adjusting a kind of a liquid crystal compound for forming the cholesteric liquid crystal layer and a mixing ratio thereof, and a temperature during alignment immobilization.

The half-width of the reflection wavelength range is adjusted depending on the application of the optical laminate and may be, for example, 10 to 500 nm and is preferably 20 to 300 nm and more preferably 30 to 100 nm.

<<Liquid Crystal Alignment Pattern of Cholesteric Liquid Crystal Layer>>

The cholesteric liquid crystal layer 16 has the liquid crystal alignment pattern in which the direction of the optical axis 40A derived from the liquid crystal compound 40 forming the cholesteric liquid crystalline phase changes while continuously rotating in the one in-plane direction of the cholesteric liquid crystal layer.

The optical axis 40A derived from the liquid crystal compound 40 is an axis having the highest refractive index in the liquid crystal compound 40, that is, a so-called slow axis. For example, in a case where the liquid crystal compound 40 is a rod-like liquid crystal compound, the optical axis 40A is along a rod-like major axis direction. In the following description, the optical axis 40A derived from the liquid crystal compound 40 will also be referred to as "the optical axis 40A of the liquid crystal compound 40" or "the optical axis 40A".

Figure 2:
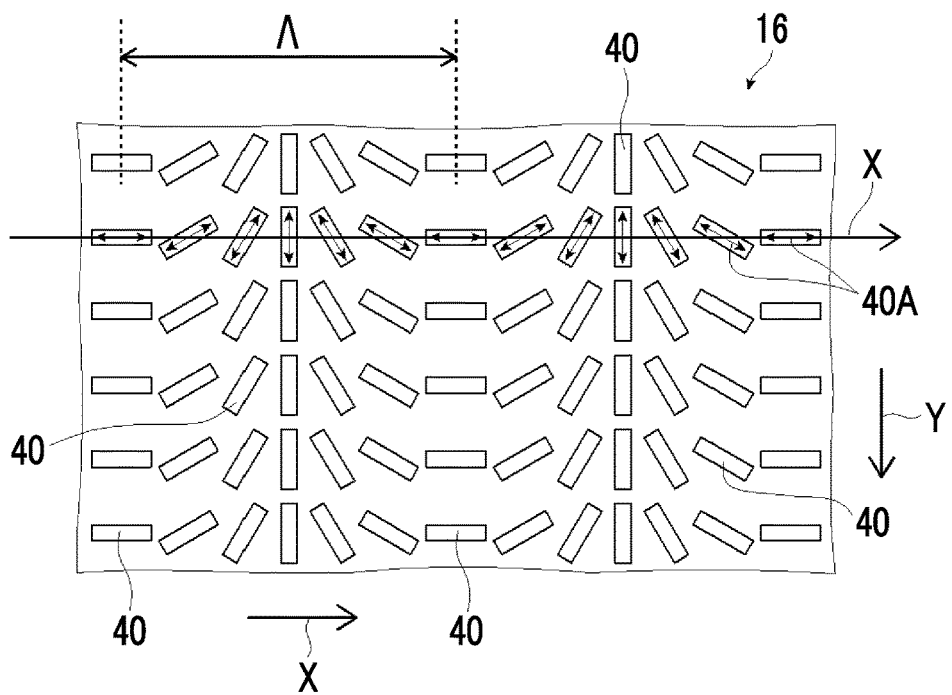
FIG. 2 is a plan view showing a cholesteric liquid crystal layer shown in FIG. 1.

FIG. 2 conceptually shows a plan view of the cholesteric liquid crystal layer 16.

The plan view is a view in a case where the cholesteric liquid crystal layer 16 (optical element 10) is seen from the top in FIG. 1, that is, a view in a case where the optical element 10 is seen from a thickness direction (laminating direction of the respective layers (films)).

In addition, in FIG. 2, in order to clarify the configuration of the cholesteric liquid crystal layer 16 according to the embodiment of the present invention, only the liquid crystal compound 40 on the surface of the photo-alignment film 14 is shown.

As shown in FIG. 2, on the surface of the photo-alignment film 14, the liquid crystal compound 40 forming the cholesteric liquid crystal layer 16 is two-dimensionally arranged according to the alignment pattern formed on the photo-alignment film 14 as the lower layer in a predetermined in-plane direction indicated by arrow X and a direction perpendicular to the one in-plane direction (arrow X direction).

In the following description, the direction perpendicular to the arrow X direction will be referred to as "Y direction" for convenience of description. That is, in FIGS. 1 and 2 and FIG. 4 described below, the Y direction is a direction perpendicular to the paper plane.

In addition, the liquid crystal compound 40 forming the cholesteric liquid crystal layer 16 has the liquid crystal alignment pattern in which the direction of the optical axis 40A changes while continuously rotating in the arrow X direction in a plane of the cholesteric liquid crystal layer 16. In the example shown in the drawing, the liquid crystal compound 40 has the liquid crystal alignment pattern in which the optical axis 40A of the liquid crystal compound 40 changes while continuously rotating counterclockwise in the arrow X direction.

Specifically, "the direction of the optical axis 40A of the liquid crystal compound 40 changes while continuously rotating in the arrow X direction (the predetermined one in-plane direction)" represents that an angle between the optical axis 40A of the liquid crystal compound 40, which is arranged in the arrow X direction, and the arrow X direction varies depending on positions in the arrow X direction, and the angle between the optical axis 40A and the arrow X direction sequentially changes from θ to θ+180° or θ-180° in the arrow X direction.

A difference between the angles of the optical axes 40A of the liquid crystal compound 40 adjacent to each other in the arrow X direction is preferably 45° or less, more preferably 15° or less, and still more preferably less than 15°.

On the other hand, in the liquid crystal compound 40 forming the cholesteric liquid crystal layer 16, the directions of the optical axes 40A are the same in the Y direction perpendicular to the arrow X direction, that is, the Y direction perpendicular to the one in-plane direction in which the optical axis 40A continuously rotates.

In other words, in the liquid crystal compound 40 forming the cholesteric liquid crystal layer 16, angles between the optical axes 40A of the liquid crystal compound 40 and the arrow X direction are the same in the Y direction.

In the optical element 10, in the liquid crystal alignment pattern of the liquid crystal compound 40, the length (distance) over which the optical axis 40A of the liquid crystal compound 40 rotates by 180° in the arrow X direction in which the optical axis 40A changes while continuously rotating in a plane is the length Λ of the single period in the liquid crystal alignment pattern. That is, a distance between centers of two liquid crystal compounds 40 in the arrow X direction is the length Λ of the single period, the two liquid crystal compounds having the same angle in the arrow X direction.

Specifically, as shown in FIGS. 1 and 2, a distance of centers in the arrow X direction of two liquid crystal compounds 40 in which the arrow X direction and the direction of the optical axis 40A match each other is the length Λ of the single period. In the following description, the length Λ of the single period will also be referred to as "single period Λ".

In the optical element 10, in the liquid crystal alignment pattern of the cholesteric liquid crystal layer, the single period A is repeated in the arrow X direction, that is, in the one in-plane direction in which the direction of the optical axis 40A changes while continuously rotating.

The cholesteric liquid crystal layer obtained by immobilizing a cholesteric liquid crystalline phase typically reflects incident light (circularly polarized light) by specular reflection.

On the other hand, the cholesteric liquid crystal layer 16 reflects incidence light in a direction having an angle in the arrow X direction with respect to the incidence light. The cholesteric liquid crystal layer 16 has the liquid crystal alignment pattern in which the optical axis 40A changes while continuously rotating in the arrow X direction in a plane (the predetermined one in-plane direction).

The cholesteric liquid crystal layer 16 shown in FIG. 1 reflects right circularly polarized light R in a selective wavelength range.

Accordingly, in a case where light is incident into the cholesteric liquid crystal layer 16, the cholesteric liquid crystal layer 16 reflects only right circularly polarized light R in the selective wavelength range and allows transmission of the other light.

A typical cholesteric liquid crystal layer not having the liquid crystal alignment pattern in a plane reflects incident circularly polarized light by specular reflection.

On the other hand, the cholesteric liquid crystal layer 16 that has the liquid crystal alignment pattern in which the optical axis 40A changes while continuously rotating in the arrow X direction in a plane reflects incident circularly polarized light in a direction tilted in the arrow X direction with respect to specular reflection.

Hereinafter, this point will be described.

In a case where the right circularly polarized light R incident into the cholesteric liquid crystal layer 16 is reflected from the cholesteric liquid crystal layer, the absolute phase changes depending on the directions of the optical axes 40A of the respective liquid crystal compounds 40.

Here, in the cholesteric liquid crystal layer 16, the optical axis 40A of the liquid crystal compound 40 changes while rotating in the arrow X direction (the one in-plane direction). Therefore, the amount of change in the absolute phase of the incident right circularly polarized light R varies depending on the direction of the optical axis 40A.

Further, the liquid crystal alignment pattern formed in the cholesteric liquid crystal layer 16 is a pattern that is periodic in the arrow X direction. Therefore, an absolute phase that is periodic in the arrow X direction corresponding to the direction of each of the optical axes 40A is assigned to the right circularly polarized light R incident into the cholesteric liquid crystal layer 16.

In addition, the direction of the optical axis 40A of the liquid crystal compound 40 with respect to the arrow X direction is uniform in the arrangement of the liquid crystal compound 40 in the Y direction perpendicular to arrow X direction.

As a result, in the cholesteric liquid crystal layer 16, an equiphase surface that is tilted to fall in the arrow X direction with respect to an XY plane is formed for the right circularly polarized light R. The equiphase surface is formed to connect the liquid crystal compounds 40 that are helically turned and in which the directions of the optical axes 40A match with each other in the turning direction.

In the cholesteric liquid crystal layer 16, the equiphase surface functions as a reflecting surface.

In a cross-section of the cholesteric liquid crystalline phase observed with a SEM, a stripe pattern including bright portions and dark portions derived from the cholesteric liquid crystalline phase is observed.

As is well known, the bright portions and the dark portions of the cholesteric liquid crystalline phase are formed to connect the liquid crystal compounds 40 that are helically turned and in which the directions of the optical axes 40A match with each other in the turning direction. That is, the bright portions and the dark portions match with the above-described equiphase surface.

Here, bright portions and dark portions of a typical cholesteric liquid crystal layer are parallel to the main surface, that is, the alignment surface that is the formation surface.

On the other hand, the cholesteric liquid crystal layer 16 has the liquid crystal alignment pattern in which the optical axis 40A changes while continuously rotating in the arrow X direction in a plane. Accordingly, as conceptually shown in FIG. 3, bright portions and dark portions D of the cholesteric liquid crystal layer 16 are tilted to fall in the arrow X direction with respect to the main surface, that is, the photo-alignment film 14 according to the arrangement of the liquid crystal compounds 40 in which the directions of the optical axes 40A match with each other in the helical turning.

Therefore, the incident right circularly polarized light R are reflected in the normal direction of the bright portions B and the dark portions D, that is, the equiphase surface and are reflected in a direction tilted in the arrow X direction with respect to the XY plane (main surface of the cholesteric liquid crystal layer).

By reversing the rotation direction of the optical axis 40A of the liquid crystal compound 40 toward the arrow X direction, a reflection direction of the right circularly polarized light R can be reversed. That is, in FIGS. 1 and 2, the rotation direction of the optical axis 40A toward the arrow X direction is counterclockwise, and the right circularly polarized light R is reflected in a state where it is tilted in the arrow X direction. By setting the rotation direction of the optical axis 40A to be clockwise, the tilt direction of the bright portions B and the dark portions D is reversed, and the right circularly polarized light R is reflected in a state where it is tilted in a direction opposite to the arrow X direction. In other words, this aspect is the same as a case where the arrow X direction in which the optical axis 40A rotates counterclockwise is reversed.

Further, as described above, in the cholesteric liquid crystal layer 16 that reflects right circularly polarized light and the cholesteric liquid crystal layer that reflects left circularly polarized light, the helical turning directions of the liquid crystal compounds 40 are opposite to each other. Accordingly, in the cholesteric liquid crystal layer that reflects left circularly polarized light and have the liquid crystal alignment pattern in which the optical axis 40A rotates counterclockwise in the arrow X direction as in the example shown in the drawing, the tilt direction of the bright portions B and the dark portions D is opposite, and thus the left circularly polarized light is reflected toward a direction opposite to the arrow X direction.

In the cholesteric liquid crystal layer 16, as the single period $\Lambda$ of the liquid crystal alignment pattern in which the optical axis 40A continuously rotates in a plane decreases, the above-described tilt angle of reflected light with respect to incidence light increases. That is, as the single period $\Lambda$ decreases, reflected light can be reflected in a state where it is largely tilted with respect to the incidence direction.

Accordingly, in the cholesteric liquid crystal layer 16, the reflection angle of reflected light of incident light can be adjusted by adjusting the single period $\Lambda$.

The single period $\Lambda$ of the liquid crystal alignment pattern is not particularly limited. From the viewpoint that reflected light can be reflected in a state where it is largely tilted with respect to the incidence direction, the single period $\Lambda$ of the liquid crystal alignment pattern is preferably 1.6 µm or less, more preferably 1.0 µm or less, and still more preferably 0.6 µm or less.

In addition, in the cholesteric liquid crystal layer 16 shown in FIG. 2, the liquid crystal compound 40 is tilted with respect to the main surface and the tilt direction substantially matches with the bright lines and the dark lines of the cholesteric liquid crystalline phase, and bright portions and dark portions corresponding to a reflecting surface match with the liquid crystal compound 40. Therefore, in the cholesteric liquid crystal layer 16, the action of the liquid crystal compound 40 on light reflection (diffraction) increases, the diffraction efficiency can be improved. As a result, for example, the amount of reflected light with respect to incidence light can be further improved as compared to the related art.

In the example shown in FIG. 2, the tilt of the liquid crystal compound 40 and the tilt of the bright lines and the dark lines of the cholesteric liquid crystalline phase substantially match with each other, but the present invention is not limited thereto. For example, the liquid crystal compound 40 may not be tilted, that is, may be parallel to the main surface of the cholesteric liquid crystal layer.

In the optical element shown in FIGS. 1 and 2, the optical axis 40A of the liquid crystal compound 40 in the alignment pattern of the cholesteric liquid crystal layer continuously rotates only in the arrow X direction.

However, the present invention is not limited thereto, and various configurations can be used as long as the optical axis 40A of the liquid crystal compound 40 in the liquid crystal layer continuously rotates in the one in-plane direction.

For example, the liquid crystal alignment pattern may be a concentric circular pattern having a concentric circular shape where the one in-plane direction in which the direction of the optical axis of the liquid crystal compound changes while continuously rotating moves from an inside toward an outside.

This way, in the liquid crystal layer having the concentric circular liquid crystal alignment pattern, transmission or reflection of incidence light can be allowed as diverging light or converging light depending on the rotation direction of the optical axis of the liquid crystal compound and the direction of circularly polarized light to be incident.

That is, by setting the liquid crystal alignment pattern of the liquid crystal layer in a concentric circular shape, the optical element exhibits, for example, a function as a convex lens or a concave lens.

Here, in the example shown in FIG. 1, the liquid crystal layer in the optical element is the cholesteric liquid crystal layer but is not particularly limited. As in the optical element shown in FIG. 8, the liquid crystal layer may be an optically-anisotropic layer not having a helical structure where the liquid crystal compound is helically turned and laminated.

Figure 8:
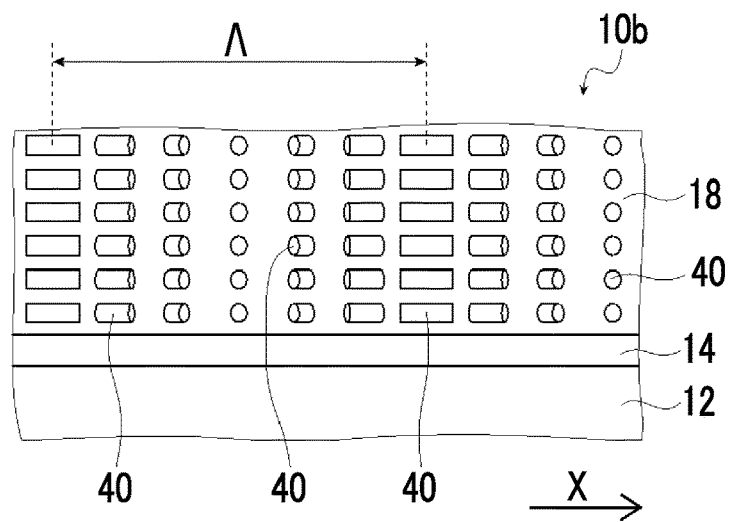
FIG. 8 is a diagram conceptually showing another example of an optical element prepared using a method of manufacturing an optical element according to the present invention.

An optically-anisotropic layer 18 in an optical element 10b shown in FIG. 8 is a layer formed of a composition including a liquid crystal compound, and has the liquid crystal alignment pattern in which the direction of the optical axis 40A derived from the liquid crystal compound 40 changes while continuously rotating in the one in-plane direction indicated by arrow X in a plane of the optically-anisotropic layer. That is, the plan view of the optically-anisotropic layer 18 shown in FIG. 8 is the same as that of the configuration shown in FIG. 2. The optically-anisotropic layer 18 shown in FIG. 8 has a configuration in which the liquid crystal compounds 40 having the same orientation are laminated in the thickness direction.

As described above, in the liquid crystal compounds arranged in the Y direction in the optically-anisotropic layer 18, the angles between the optical axes 40A and the arrow X direction (the one in-plane direction in which the direction of the optical axis of the liquid crystal compound 40 rotates) are the same. Regions where the liquid crystal compounds 40 in which the angles between the optical axes 40A and the arrow X direction are the same are disposed in the Y direction will be referred to as "regions R".

In this case, it is preferable that an in-plane retardation (Re) value of each of the regions R is a half wavelength, that is, $\lambda/2$. The in-plane retardation is calculated from the product of a difference $\Delta n$ in refractive index of the region R and the thickness of the optically-anisotropic layer 18. Here, the difference in refractive index generated by refractive index anisotropy of the region R in the optically-anisotropic layer 18 is defined by a difference between a refractive index of a direction of an in-plane slow axis of the region R and a refractive index of a direction perpendicular to the direction of the slow axis. That is, the difference $\Delta n$ in refractive index generated by refractive index anisotropy of the region R is the same as a difference between a refractive index of the liquid crystal compound 40 in the direction of the optical axis 40A and a refractive index of the liquid crystal compound 40 in a direction perpendicular to the optical axis 40A in a plane of the region R. That is, the difference $\Delta n$ in refractive index is the same as the difference in refractive index of the liquid crystal compound.

In a case where circularly polarized light is incident into the above-described optically-anisotropic layer 18, the light is refracted such that the direction of the circularly polarized light is converted.

Figure 9:
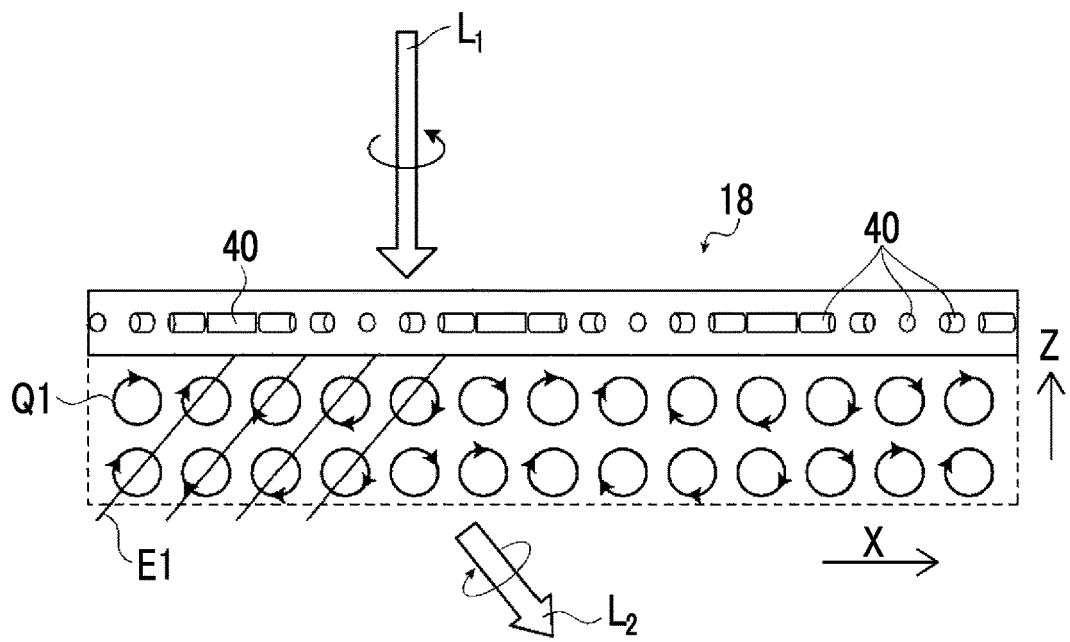
FIG. 9 is a conceptual diagram showing an action of the optical element shown in FIG. 8.

This action is conceptually shown in FIG. 9 using the optically-anisotropic layer 18 as an example. In the optically-anisotropic layer 18, the value of the product of the difference in refractive index of the liquid crystal compound 40 and the thickness of the optically-anisotropic layer 18 is $\lambda/2$.

As shown in FIG. 9, in a case where the value of the product of the difference in refractive index of the liquid crystal compound 40 in the optically-anisotropic layer 18 and the thickness of the optically-anisotropic layer 18 is $\lambda/2$ and incidence light $L_1$ as left circularly polarized light is incident into the optically-anisotropic layer 18, the incidence light $L_1$ transmits through the optically-anisotropic layer 18 to be imparted with a phase difference of 180°, and the transmitted light $L_2$ is converted into right circularly polarized light.

In addition, in a case where the incidence light $L_1$ transmits through the optically-anisotropic layer 18, an absolute phase thereof changes depending on the direction of the optical axis 40A of each of the liquid crystal compounds 40. In this case, the direction of the optical axis 40A changes while rotating in the arrow X direction. Therefore, the amount of change in the absolute phase of the incidence light $L_1$ varies depending on the direction of the optical axis 40A. Further, the liquid crystal alignment pattern that is formed in the optically-anisotropic layer 18 is a pattern that is periodic in the arrow X direction. Therefore, as shown in FIG. 9, the incidence light $L_1$ transmitted through the optically-anisotropic layer 18 is imparted with an absolute phase Q1 that is periodic in the arrow X direction corresponding to the direction of each of the optical axes 40A. As a result, an equiphase surface E1 that is tilted in a direction opposite to the arrow X direction is formed.

Therefore, the transmitted light $L_2$ is refracted to be tilted in a direction perpendicular to the equiphase surface E1 and travels in a direction different from a traveling direction of the incidence light $L_1$. This way, the incidence light $L_1$ of the left circularly polarized light is converted into the transmitted light $L_2$ of right circularly polarized light that is tilted by a predetermined angle in the arrow X direction with respect to an incidence direction.

Figure 10:
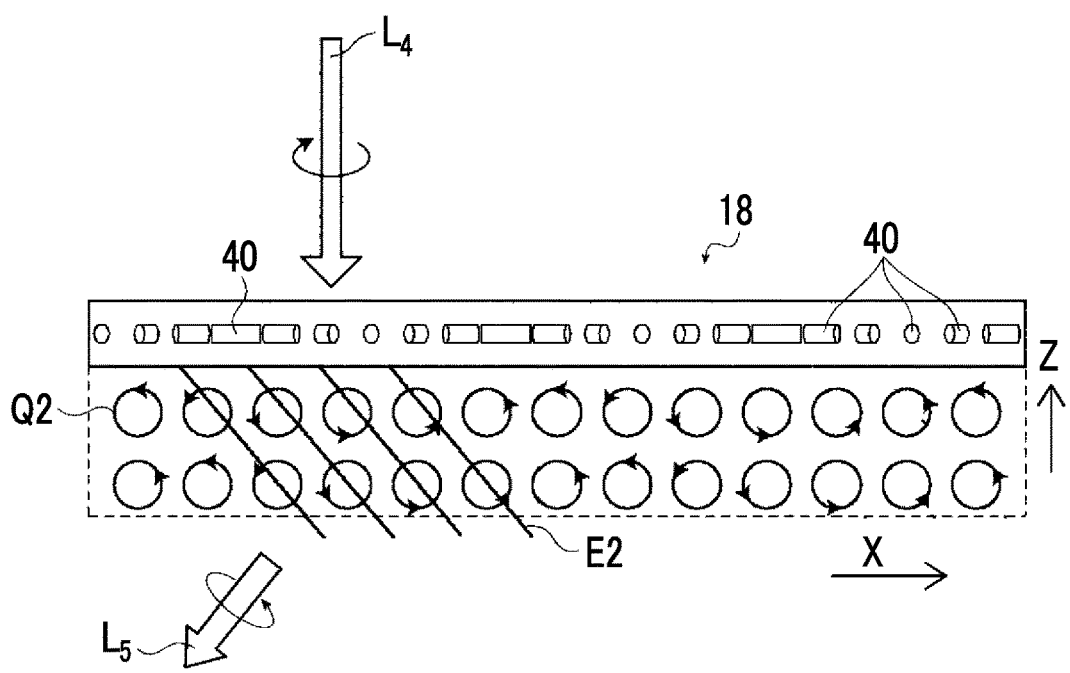
FIG. 10 is a conceptual diagram showing the action of the optical element shown in FIG. 8.

On the other hand, as conceptually shown in FIG. 10, in a case where the value of the product of the difference in refractive index of the liquid crystal compound 40 in the optically-anisotropic layer 18 and the thickness of the optically-anisotropic layer 18 is $\lambda/2$ and incidence light $L_4$ as right circularly polarized light is incident into the optically-anisotropic layer 18, the incidence light $L_4$ transmits through the optically-anisotropic layer 18 to be imparted with a phase difference of 180° and is converted into transmitted light $L_5$ of left circularly polarized light.

In addition, in a case where the incidence light $L_4$ transmits through the optically-anisotropic layer 18, an absolute phase thereof changes depending on the direction of the optical axis 40A of each of the liquid crystal compounds 40. In this case, the direction of the optical axis 40A changes while rotating in the arrow X direction. Therefore, the amount of change in the absolute phase of the incidence light $L_4$ varies depending on the direction of the optical axis 40A. Further, the liquid crystal alignment pattern that is formed in the optically-anisotropic layer 18 is a pattern that is periodic in the arrow X direction. Therefore, as shown in FIG. 10, the incidence light $L_4$ transmitted through the optically-anisotropic layer 18 is imparted with an absolute phase Q2 that is periodic in the arrow X direction corresponding to the direction of each of the optical axes 40A.

Here, the incidence light $L_4$ is right circularly polarized light. Therefore, the absolute phase Q2 that is periodic in the arrow X direction corresponding to the direction of the optical axis 40A is opposite to the incidence light $L_1$ as left circularly polarized light. As a result, in the incidence light $L_4$, an equiphase surface E2 that is tilted in the arrow X direction opposite to that of the incidence light $L_1$ is formed.

Therefore, the incidence light $L_4$ is refracted to be tilted in a direction perpendicular to the equiphase surface E2 and travels in a direction different from a traveling direction of the incidence light $L_4$. This way, the incidence light La is converted into the transmitted light $L_5$ of left circularly polarized light that is tilted by a predetermined angle in a direction opposite to the arrow X direction with respect to an incidence direction.

Here, by changing the single period Λ of the liquid crystal alignment pattern formed in the optically-anisotropic layer 18, refraction angles of the transmitted light components $L_2$ and $L_5$ can be adjusted. Specifically, as the single period Λ of the liquid crystal alignment pattern decreases, light components transmitted through the liquid crystal compounds 40 adjacent to each other more strongly interfere with each other. Therefore, the transmitted light components $L_2$ and $L_5$ can be more largely refracted.

In addition, refraction angles of the transmitted light components $L_2$ and $L_5$ with respect to the incidence light components $L_1$ and $L_4$ vary depending on the wavelengths of the incidence light components $L_1$ and $L_4$ (the transmitted light components $L_2$ and $L_5$). Specifically, as the wavelength of incidence light increases, the transmitted light is largely refracted. That is, in a case where incidence light is red light, green light, and blue light, the red light is refracted to the highest degree, and the blue light is refracted to the lowest degree.

Further, by reversing the rotation direction of the optical axis 40A of the liquid crystal compound 40 that rotates in the arrow X direction, the refraction direction of transmitted light can be reversed.

The optically-anisotropic layer 18 is formed of a cured layer of a liquid crystal composition including a rod-like liquid crystal compound or a disk-like liquid crystal compound, and has a liquid crystal alignment pattern in which an optical axis of the rod-like liquid crystal compound or an optical axis of the disk-like liquid crystal compound is aligned as described above.

By forming the photo-alignment film 14 on the support 12, applying the liquid crystal composition to the photo-alignment film 14, and curing the applied liquid crystal composition, the optically-anisotropic layer 18 consisting of the cured layer of the liquid crystal composition can be obtained. A method of applying the liquid crystal composition and a method of curing the liquid crystal composition are as described above.

Although the optically-anisotropic layer 18 functions as a so-called λ/2 plate, the present invention includes an aspect where a laminate including the support 12 and the photo-alignment film 14 that are integrated functions as a λ/2 plate.

In addition, the liquid crystal composition for forming the optically-anisotropic layer 18 includes a rod-like liquid crystal compound or a disk-like liquid crystal compound and may further include other components such as a leveling agent, an alignment control agent, a polymerization initiator, a crosslinking agent, or an alignment assistant. In addition, the liquid crystal composition may include a solvent.

As the rod-like liquid crystal compound, the disk-like liquid crystal compound, or the like in the liquid crystal composition for forming the optically-anisotropic layer 18, the same rod-like liquid crystal compound, the same disk-like liquid crystal compound, or the like as that in the liquid crystal composition for forming the cholesteric liquid crystal layer 16 can be used.

That is, the liquid crystal composition for forming the optically-anisotropic layer 18 is the same as the liquid crystal composition for forming the cholesteric liquid crystal layer 16, except that it includes a chiral agent.

In addition, it is preferable that the optically-anisotropic layer 18 has a wide range for the wavelength of incidence light and is formed of a liquid crystal material having a reverse birefringence index dispersion. In addition, it is also preferable that the optically-anisotropic layer 18 can be made to have a substantially wide range for the wavelength of incidence light by imparting a twist component to the liquid crystal composition or by laminating different retardation layers. For example, in the optically-anisotropic layer 18, a method of realizing a λ/2 plate having a wide-range pattern by laminating two liquid crystal layers having different twisted directions is disclosed in, for example, JP2014-089476A and can be preferably used in the present invention.

[Method of Manufacturing Optical Element]

The method of manufacturing an optical element according to the embodiment of the present invention comprises:

an exposure step of performing interference exposure to a surface of a photo-alignment film including a photo-alignment material to form, on the photo-alignment film, an alignment pattern in which a direction of an optical axis derived from a liquid crystal compound changes while continuously rotating in at least one in-plane direction; and a liquid crystal layer forming step of applying a liquid crystal composition including a liquid crystal compound to the photo-alignment film where the alignment pattern is formed to form a liquid crystal layer, in which the photo-alignment material includes an azo compound, and the exposure step is performed in an environment having a relative humidity of 50% or less.

<Formation of Photo-Alignment Film>

The method of forming the photo-alignment film 14 includes, for example: an application step of applying a coating liquid for forming a photo-alignment film (hereinafter, also referred to as "coating liquid") to a surface of the support 12; a drying step of drying the applied coating film; and an exposure step of exposing the dried coating film to laser light to form an alignment pattern.

Here, as described above, in the present invention, the photo-alignment film includes a photo-alignment material including an azo compound.

(Application Step)

A method of applying the coating liquid for forming a photo-alignment film is not particularly limited, and various well-known methods used for applying liquid, for example, bar coating, gravure coating, or spray coating can be used. In addition, the coating thickness of the coating liquid (the thickness of the coating film) that is required to obtain a photo-alignment film having a desired thickness may be appropriately set depending on the composition and the like of the coating liquid.

(Drying Step)

A method of drying the coating film is not particularly limited, and all of the well-known drying methods such as heating drying by a heater or heating drying by hot air can be used.

(Exposure Step)

The exposure step is a step of performing interference exposure to a surface of a photo-alignment film including a photo-alignment material to form, on the photo-alignment film, an alignment pattern in which a direction of an optical axis derived from a liquid crystal compound changes while continuously rotating in at least one in-plane direction.

Here, in the present invention, the exposure step is performed in an environment having a relative humidity of 50% or less.

Figure 4:
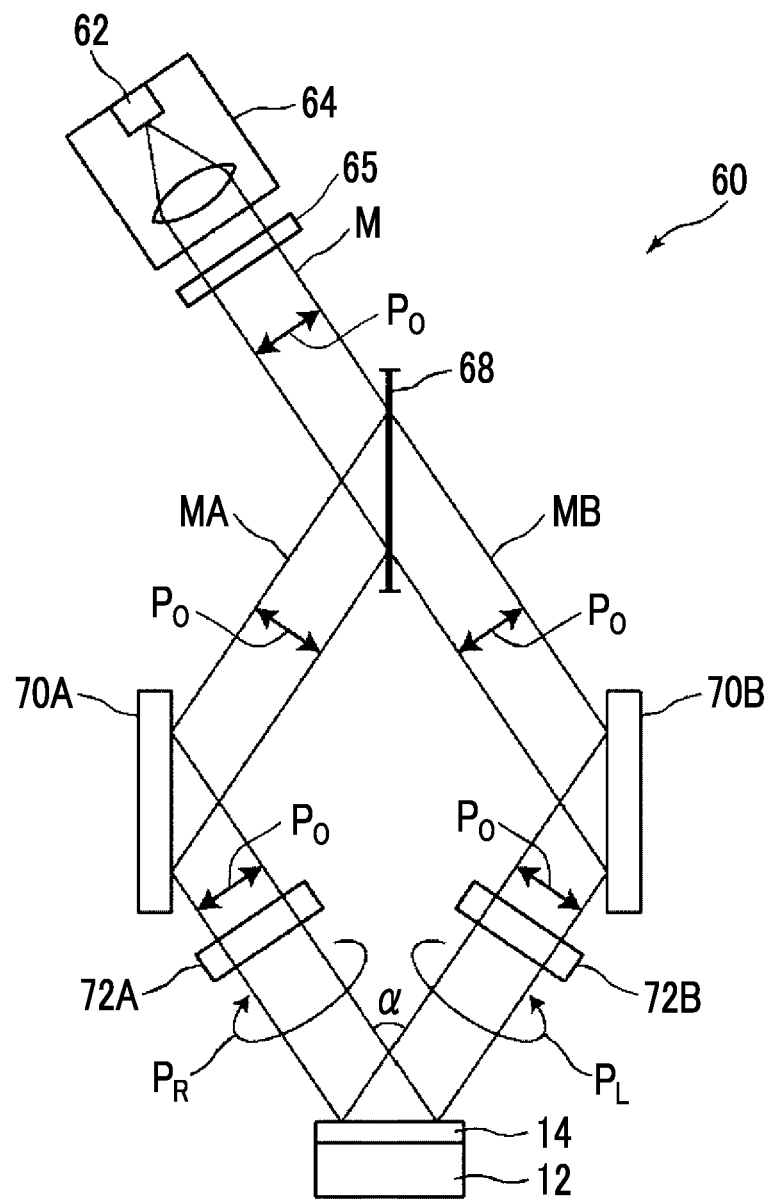
FIG. 4 is a conceptual diagram showing an example of an exposure device that exposes a photo-alignment film.

FIG. 4 conceptually shows an example of an exposure device that exposes the photo-alignment film 14 to form an alignment pattern.

An exposure device 60 shown in FIG. 4 includes: a light source 64 including a laser 62; an λ/2 plate 65 that changes a polarization direction of laser light M emitted from the laser 62; a polarization beam splitter 68 that splits the laser light M emitted from the laser 62 into two beams MA and MB; mirrors 70A and 70B that are disposed on optical paths of the splitted two beams MA and MB; and λ/4 plates 72A and 72B.

The light source 64 emits linearly polarized light $P_0$. The λ/4 plate 72A converts the linearly polarized light $P_0$ (beam MA) into right circularly polarized light $P_R$, and the λ/4 plate 72B converts the linearly polarized light $P_0$ (beam MB) into left circularly polarized light $P_L$.

The support 12 including the photo-alignment film 14 on which the alignment pattern is not yet formed, that is, including the dried coating film is disposed at an exposed portion, the two beams MA and MB intersect and interfere each other on the photo-alignment film 14, and the photo-alignment film 14 is irradiated with and exposed to the interference light.

Due to the interference at this time, the polarization state of light with which the photo-alignment film 14 is irradiated periodically changes according to interference fringes. As a result, in the photo-alignment film 14, an alignment pattern in which the alignment state periodically changes can be obtained. Hereinafter, the photo-alignment film having the alignment pattern will also be referred to as "patterned photo-alignment film".

In the exposure device 60, by changing an intersecting angle α between the two beams MA and MB, the period of the alignment pattern can be adjusted. That is, by adjusting the intersecting angle α in the exposure device 60, in the alignment pattern in which the optical axis 40A derived from the liquid crystal compound 40 continuously rotates in the one in-plane direction, the length of the single period over which the optical axis 40A rotates by 180° in the one in-plane direction in which the optical axis 40A rotates can be adjusted.

By forming the cholesteric liquid crystal layer on the photo-alignment film 14 having the alignment pattern in which the alignment state periodically changes, as described below, the cholesteric liquid crystal layer having the liquid crystal alignment pattern in which the optical axis 40A derived from the liquid crystal compound 40 continuously rotates in the one in-plane direction can be formed.

In addition, by rotating the optical axes of the λ/4 plates 72A and 72B by 90°, respectively, the rotation direction of the optical axis 40A can be reversed.

As described above, the patterned photo-alignment film has the alignment pattern for aligning the liquid crystal compound to have the liquid crystal alignment pattern in which the direction of the optical axis of the liquid crystal compound in the cholesteric liquid crystal layer formed on the patterned photo-alignment film changes while continuously rotating in at least one in-plane direction. In a case where an axis in the direction in which the liquid crystal compound is aligned is an alignment axis, it can be said that the patterned photo-alignment film has the alignment pattern in which the direction of the alignment axis changes while continuously rotating in at least one in-plane direction. The alignment axis of the patterned photo-alignment film can be detected by measuring absorption anisotropy. For example, in a case where the amount of light transmitted through the patterned photo-alignment film is measured by irradiating the patterned photo-alignment film with linearly polarized light while rotating the patterned photo-alignment film, it is observed that a direction in which the light amount is the maximum or the minimum gradually changes in the one in-plane direction.

Here, as described above, in a case where the photo-alignment film is exposed to interference light (hereinafter, also referred to as "interference exposure") to form the alignment pattern on the photo-alignment film and the liquid crystal layer is formed on the photo-alignment film having the alignment pattern to form the cholesteric liquid crystal layer having the liquid crystal alignment pattern in which the direction of the optical axis derived from a liquid crystal compound changes while continuously rotating in at least one in-plane direction, alignment defects of the liquid crystal compound in the cholesteric liquid crystal layer may occur.

According to an investigation by the present inventors, it was found that the alignment defects of the liquid crystal compound in the cholesteric liquid crystal layer occur due to a region where an ability to align the liquid crystal compound (hereinafter, also referred to as "aligning properties") in the alignment pattern of the photo-alignment film is not sufficient. On the other hand, the present inventors conceived a configuration of increasing the exposure amount during exposure of a photo-alignment film in order to improve the aligning properties of the alignment pattern in the photo-alignment film. In this case, however, there may be a case where the aligning properties cannot be sufficiently improved.

As the photo-alignment material, an azo compound is well known.

In a case where the liquid crystal layer is formed on the photo-alignment film to form the cholesteric liquid crystal layer having the liquid crystal alignment pattern in which the direction of the optical axis derived from a liquid crystal compound changes while continuously rotating in at least one in-plane direction, it is preferable to use an azo compound from the viewpoint of the alignment ability to align the liquid crystal compound at a very small pitch and the viewpoint of the durability where high alignment ability can be maintained in a case where the liquid crystal is repeatedly aligned as the photo-alignment film.

In the related art, it is known that, in a case where the photo-alignment film formed of the azo compound is formed, the aligning properties can be improved by increasing the relative humidity in the atmospheric environment to about 60% (Yue Shi et al. Langmuir 2017, 33, 3968-3974).

On the other hand, the present inventors found that, in a case where the alignment pattern in which the direction of the alignment axis changes while continuously rotating in at least one in-plane direction is formed on the photo-alignment film, the photo-alignment film having high aligning properties can be obtained by performing the exposure step in the environment having a relative humidity of 50% or less.

The finding in the related art relates to the formation of the photo-alignment film for aligning the liquid crystal compound in the one in-plane direction, that is, the formation of the photo-alignment film where the direction of the alignment axis is aligned in the one in-plane direction. In general, the azo compound used as the material of the photo-alignment film has high hydrophilicity in many cases. It is presumed that, in a case where the material having high hydrophilicity is used and the humidity in the atmosphere is high, the photo-alignment film is humidified such that the azo compound is likely to flow. Therefore, it is presumed that the direction of the alignment axis is more likely to be aligned in the one in-plane direction as compared to a case where the humidity is low. Accordingly, the aligning properties of the photo-alignment film can be improved.

However, in a case where the photo-alignment film having the alignment pattern in which the direction of the alignment axis changes while continuously rotating in at least one in-plane direction is formed, the directions of the alignment axes need to be different from each other. In this case, it is presumed that, in a case where the humidity of the atmosphere is high and the photo-alignment film is humidified such that the azo compound is likely to flow, the azo compounds affect each other such that the alignment pattern collapses without maintaining the different directions of the alignment axes. In particular, at an end part in an exposed region, the exposure amount is small, and it is difficult to align the alignment axis in a desired direction due to the effect of an adjacent non-exposed portion. Therefore, it is presumed that, in a case where the humidity in the atmosphere is high, the alignment pattern collapses such that the aligning properties of the photo-alignment film deteriorate.

On the other hand, in the manufacturing method according to the embodiment of the present invention, the exposure step is performed in an environment having a relative humidity of 50% or less. Therefore, the easy flow of the azo compound caused by moisture absorption can be suppressed, and the collapse of the alignment pattern formed by the exposure can also be suppressed. Accordingly, the patterned photo-alignment film having high aligning properties can be formed. In addition, by forming the liquid crystal layer on the patterned photo-alignment film having high aligning properties, alignment defects of the liquid crystal compound in the liquid crystal layer can be suppressed.

From the viewpoint of, for example, improving the aligning properties of the photo-alignment film, the relative humidity of the atmosphere in the exposure step is preferably 50% or less, more preferably 30% or less, and still more preferably 10% or less.

In addition, in a case where the relative humidity in the atmospheric environment of the photo-alignment film is high between the exposure step and the liquid crystal layer forming step described below, the photo-alignment film is humidified by moisture such that the azo compound is likely to flow, and the alignment pattern may collapse. Therefore, the relative humidity in the atmospheric environment between the exposure step and the liquid crystal layer forming step is preferably 50% or less, more preferably 30% or less, and still more preferably 10% or less.

In addition, it is most preferable that all the steps are performed in an environment having a relative humidity of 50% or less.

In addition, the manufacturing method according to the embodiment of the present invention is suitably applied to a case where a photo-alignment material (azo compound) is used.

<Liquid Crystal Layer Forming Step>

The liquid crystal layer forming step is a step of forming the liquid crystal layer on the photo-alignment film having the alignment pattern.

The following description will be made using the cholesteric liquid crystal layer as an example. In the case of the optically-anisotropic layer shown in FIG. 8, the optically-anisotropic layer can be formed using basically the same method as described above, except that the liquid crystal composition does not include a chiral agent.

<<Method of Forming Cholesteric Liquid Crystal Layer>>

The cholesteric liquid crystal layer 16 can be formed by immobilizing a cholesteric liquid crystalline phase in a layer shape.

The structure in which a cholesteric liquid crystalline phase is immobilized may be a structure in which the alignment of the liquid crystal compound as a cholesteric liquid crystalline phase is immobilized. Typically, the structure in which a cholesteric liquid crystalline phase is immobilized is preferably a structure which is obtained by making the polymerizable liquid crystal compound to be in a state where a cholesteric liquid crystalline phase is aligned, polymerizing and curing the polymerizable liquid crystal compound with ultraviolet irradiation, heating, or the like to form a layer having no fluidity, and concurrently changing the state of the polymerizable liquid crystal compound into a state where the alignment state is not changed by an external field or an external force.

The structure in which a cholesteric liquid crystalline phase is immobilized is not particularly limited as long as the optical characteristics of the cholesteric liquid crystalline phase are maintained, and the liquid crystal compound 40 in the cholesteric liquid crystal layer does not necessarily exhibit liquid crystallinity. For example, the molecular weight of the polymerizable liquid crystal compound may be increased by a curing reaction such that the liquid crystallinity thereof is lost.

Here, in the manufacturing method according to the embodiment of the present invention, as described above, a photo-alignment film having high aligning properties can be formed. Therefore, the liquid crystal compound in the liquid crystal layer formed on the photo-alignment film can be appropriately aligned, and a liquid crystal layer having small alignment defects can be formed.

A method of forming the cholesteric liquid crystal layer 16 is not limited, and various well-known forming methods can be used.

In particular, in the following method of forming the cholesteric liquid crystal layer according to the embodiment of the present invention, the cholesteric liquid crystal layer 16 according to the embodiment of the present invention can be stably and suitably formed, which is preferable.

<<<Liquid Crystal Composition>>>

Examples of a material used for forming the cholesteric liquid crystal layer 16 obtained by immobilizing a cholesteric liquid crystalline phase include a liquid crystal composition including a liquid crystal compound and a chiral agent. It is preferable that the liquid crystal compound is a polymerizable liquid crystal compound.

(Polymerizable Liquid Crystal Compound)

The polymerizable liquid crystal compound may be a rod-like liquid crystal compound or a disk-like liquid crystal compound.

Examples of the rod-like polymerizable liquid crystal compound include a rod-like nematic liquid crystal compound. As the rod-like nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a polymer liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3.

In addition, the addition amount of the polymerizable liquid crystal compound in the liquid crystal composition is preferably 75 to 99.9 mass %, more preferably 80 to 99 mass %, and still more preferably 85 to 90 mass % with respect to the solid content mass (mass excluding a solvent) of the liquid crystal composition.

(Chiral Agent (Optically Active Compound))

The chiral agent has a function of causing a helical structure of a cholesteric liquid crystalline phase to be formed. The chiral agent may be selected depending on the purpose because a helical twisted direction or a helical pitch derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide (chiral agent having an isosorbide structure), or an isomannide derivative can be used.

In addition, the chiral agent in which back isomerization, dimerization, isomerization, dimerization or the like occurs due to light irradiation such that the helical twisting power (HTP) decreases can also be suitably used.

In general, the chiral agent includes an asymmetric carbon atom. However, an axially asymmetric compound or a planar asymmetric compound not having an asymmetric carbon atom can also be used as the chiral agent. Examples of the axially asymmetric compound or the planar asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group in the polymerizable chiral agent is the same as the polymerizable group in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

The content of the chiral agent in the liquid crystal composition is preferably 0.01 to 200 mol % and more preferably 1 to 30 mol % with respect to the content molar amount of the liquid crystal compound.

(Surfactant)

The liquid crystal composition may include a surfactant. It is preferable that the surfactant is a compound that can function as an alignment control agent contributing to the stable or rapid formation of a cholesteric liquid crystalline phase with planar alignment. Examples of the surfactant include a silicone-based surfactant and a fluorine-based surfactant. Among these, a fluorine-based surfactant is preferable.

The addition amount of the surfactant in the liquid crystal composition is preferably 0.01 to 10 mass %, more preferably 0.01 to 5 mass %, and still more preferably 0.02 to 1 mass % with respect to the total mass of the liquid crystal compound.

(Alignment Control Agent)

In a case where the liquid crystal composition is applied to the photo-alignment film, it is preferable that at least one additive (alignment control agent) for providing the region having a pretilt angle is added to at least one of a photo-alignment film side or an air interface side. By adding the above-described additive to the composition, the region having a pretilt angle can be provided in the optical element.

(Other Components)

The liquid crystal composition may include components other than the above-described components.

For example, the liquid crystal composition may include a polymerization initiator. As the polymerization initiator, for example, a thermal polymerization initiator or a photo-polymerization initiator can be used depending on the type of the polymerization reaction.

The amount of the polymerization initiator used is preferably 0.01 to 20 mass % and more preferably 0.5 to 5 mass % with respect to the total solid content of the composition.

In addition from the viewpoints of the uniformity of the coating film and the strength of the film, the liquid crystal composition may include a polymerizable monomer. Examples of the polymerizable monomer include a radically polymerizable compound or a cationically polymerizable compound. In particular, a polyfunctional radically polymerizable monomer is preferable.

The addition amount of the polymerizable monomer is preferably 1 to 50 parts by mass and more preferably 5 to 30 parts by mass with respect to 100 parts by mass of the liquid crystal compound.

In addition, the liquid crystal composition may include a solvent and preferably an organic solvent.

Examples of the organic solvent include an amide, a sulfoxide, a heterocyclic compound, a hydrocarbon, an alkyl halide, an ester, a ketone, and an ether.

Optionally, a polymerization inhibitor, an antioxidant, an ultraviolet absorber, a light stabilizer, a coloring material, metal oxide fine particles, or the like can be added to the liquid crystal composition in a range where optical performance and the like do not deteriorate.

<<<Formation of Cholesteric Liquid Crystal Layer>>>

In a case where the cholesteric liquid crystal layer is formed, it is preferable that the cholesteric liquid crystal layer is formed by applying the liquid crystal composition to a surface where the cholesteric liquid crystal layer is to be formed, aligning the liquid crystal compound to a state of a cholesteric liquid crystalline phase, and curing the liquid crystal compound.

That is, the above-described liquid crystal composition including the liquid crystal compound and the chiral agent is applied to the photo-alignment film 14 having an alignment pattern corresponding to the above-described liquid crystal alignment pattern in which the direction of the optical axis 40A rotates in at least one in-plane direction.

For the application of the liquid crystal composition, a printing method such as ink jet or scroll printing or a well-known method such as spin coating, bar coating, or spray coating capable of uniformly applying liquid to a sheet-shaped material can be used.

The thickness of the coating film of the liquid crystal composition is not particularly limited and may be appropriately set depending on the thickness of the formed cholesteric liquid crystal layer 16.

Here, in the following method, a cholesteric liquid crystal layer having a large film thickness can be formed by performing the application once. In consideration of this point, it is preferable that the thickness dc of the coating film of the liquid crystal composition exceeds half of the single period Λ of the liquid crystal alignment pattern. That is, it is preferable that the thickness dc of the coating film of the liquid crystal composition satisfies "dc>Λ/2".

After the coating film of the liquid crystal composition is formed, a heating step of heating the liquid crystal composition is performed. Through the heating treatment, the liquid crystal compound 40 is aligned as described above.

It is preferable that the heating treatment is performed at a temperature T1 in a temperature range of a crystal-nematic phase transition temperature (Cr—Ne phase transition temperature) to a nematic-isotropic phase transition temperature (Ne-Iso phase transition temperature) of the liquid crystal compound 40.

In a case where the heating treatment temperature is lower than the Cr—Ne phase transition temperature, there may be a problem in that, for example, the liquid crystal compound 40 cannot be appropriately aligned.

In a case where the heating treatment temperature is higher than the Ne-Iso phase transition temperature, there may be a problem such as an increase in alignment defects or a decrease in diffraction efficiency.

The heating treatment time is not particularly limited and is preferably 10 to 600 seconds, more preferably 15 to 300 seconds, and still more preferably 30 to 200 seconds.

In order to stably tilt the liquid crystal compound 40 with respect to the main surface in the upper region, that is, in the region spaced from the photo-alignment film 14, it is preferable that one helical pitch, that is, the pitch P is small in a state where the heating treatment ends.

Specifically, with respect to the single period Λ of the liquid crystal alignment pattern, it is preferable that the pitch P satisfies "P/Λ≤1.5" and it is more preferable that the pitch P satisfies "P/Λ≤1.2".

After completion of the heating step, it is preferable to cure the composition layer.

A curing method is not particularly limited, and examples thereof include a photocuring treatment and a thermal curing treatment. In particular, a light irradiation treatment is preferable, and an ultraviolet irradiation treatment is more preferable. In a case where the disk-like liquid crystal compound has a polymerizable group, it is preferable that the curing treatment is a polymerization reaction by light irradiation (in particular, ultraviolet irradiation), and it is more preferable that the curing treatment is a radical polymerization reaction by light irradiation (in particular, ultraviolet irradiation).

For the ultraviolet irradiation, a light source such as an ultraviolet lamp is used.

The irradiation energy dose of ultraviolet light is not particularly limited and, in general, is preferably about 100 to 800 mJ/cm$^2$. The time of ultraviolet irradiation is not particularly limited and may be appropriately determined from the viewpoint of obtaining both sufficient strength and productivity of the obtained layer.

In the curing by light irradiation, the exposure may be performed once. However, it is preferable that a first exposure step is performed after the heating treatment, and subsequently a second exposure step of emitting light having a wavelength different from that of the first exposure step is performed.

By performing the two-step exposure using the chiral agent in which the HTP decreases due to light irradiation, one helical pitch (pitch P) is extended in the first exposure step, and the liquid crystal composition is cured in the second exposure step. As a result, the cholesteric liquid crystal layer 16 having one helical pitch exceeding "P/Λ≤1.5" can be formed, and even in the cholesteric liquid crystal layer 16 having one helical pitch exceeding "P/Λ≤1.5", the liquid crystal compound 40 can be stably tilted with respect to the main surface in the upper region, that is, in the region spaced from the photo-alignment film 14.

By performing the exposure step twice, the cholesteric liquid crystal layer 16 can be controlled to have a configuration where, in a cross-section observed with a SEM, a region where the formation period of the bright portions and the dark portions, that is, the pitch P varies depending on positions in the thickness direction is provided.

In addition, by performing the exposure step twice, the cholesteric liquid crystal layer 16 can be controlled to have a configuration where, in a cross-section observed with a SEM, a region where the tilt angle θ1 varies depending on positions in the thickness direction is provided. The tilt angle θ1 refers to an angle of the bright portions and the dark portions with respect to the main surface of the cholesteric liquid crystal layer 16 as shown in FIG. 3.

It is preferable that the cholesteric liquid crystal layer 16 has a region where the tilt angle θ1 continuously increases in one thickness direction. In the example shown in the drawing, it is preferable that the cholesteric liquid crystal layer 16 has a region where the tilt angle θ1 continuously increases from the photo-alignment film 14 side to the side (air side interface A) away from the photo-alignment film 14.

It is more preferable that the cholesteric liquid crystal layer 16 has a region where the tilt angle θ1 continuously increases in one thickness direction and a region where the tilt angle θ1 continuously decreases in the one thickness direction. In the example shown in the drawing, it is more preferable that the cholesteric liquid crystal layer 16 has a region where the tilt angle θ1 continuously increases from the photo-alignment film 14 side to the side away from the photo-alignment film 14 and a region where the tilt angle θ1 continuously decreases from the photo-alignment film 14 side to the side away from the photo-alignment film 14. In particular, it is preferable that the cholesteric liquid crystal layer 16 has a region that is closest to the photo-alignment film 14 side in the thickness direction and where the increase of the tilt angle θ1 is the smallest, an intermediate region where the increase of the tilt angle θ1 is large, and a region that is the farthest from the photo-alignment film 14 and where the tilt angle θ1 continuously decreases with respect to the intermediate region.

In the cholesteric liquid crystal layer 16 having the structure in which the pitch P and/or the tilt angle θ continuously changes in the thickness direction, the performance in which the incidence angle dependence of the transmittance is wide can be obtained. An angle range where the transmittance decreases correspond to an angle range where incidence light is diffracted. Accordingly, by using the diffraction element in which the incidence angle dependence of the transmittance is wide, for example, for an element for incidence or emission of a light guide plate of AR glasses, AR glasses having a wide viewing angle can be obtained.

The light used for the exposure is not particularly limited, and it is preferable to use ultraviolet light. The wavelength of irradiated ultraviolet light is preferably 250 to 430 nm.

The total irradiation energy is preferably 2 mJ/cm$^2$ to 50 J/cm$^2$ and more preferably 5 to 1500 mJ/cm$^2$. In order to promote a photopolymerization reaction, the exposure may be performed under heating conditions or in a nitrogen atmosphere.

The thickness of the cholesteric liquid crystal layer 16 formed using the forming method according to the embodiment of the present invention is not particularly limited and may be appropriately set depending on the selective reflection center wavelength of the cholesteric liquid crystal layer 16, the reflectivity (diffraction efficiency) required for the cholesteric liquid crystal layer 16, and the like.

The film thickness of the cholesteric liquid crystal layer 16 formed using the forming method according to the embodiment of the present invention is preferably 1.0 μm or more and more preferably 2.0 μm or more. The upper limit of the thickness of the cholesteric liquid crystal layer 16 formed using the forming method according to the embodiment of the present invention is about 6 μm.

The manufacturing method according to the embodiment of the present invention is suitably applicable to the formation of the cholesteric liquid crystal layer using the multiple coating of repeating the formation of the cholesteric liquid crystal layer.

Figure 5:
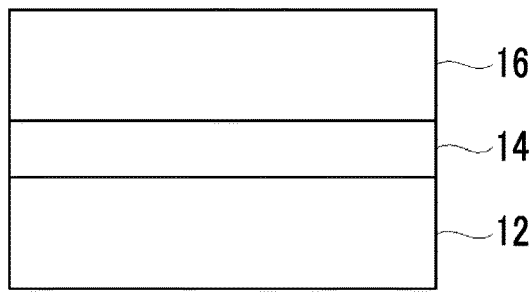
FIG. 5 is a schematic diagram showing one step in the method of manufacturing an optical element according to the present invention.
Figure 6:
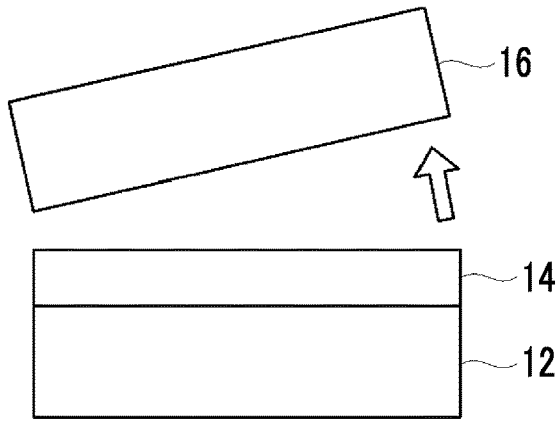
FIG. 6 is a schematic diagram showing one step in the method of manufacturing an optical element according to the present invention.
Figure 7:
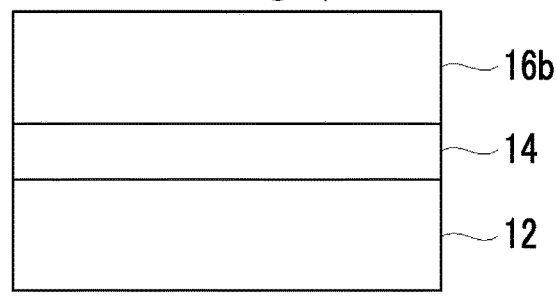
FIG. 7 is a schematic diagram showing one step in the method of manufacturing an optical element according to the present invention.

Here, in the manufacturing method according to the embodiment of the present invention, the photo-alignment film may be used again by peeling off the liquid crystal layer from an interface with the photo-alignment film after forming the liquid crystal layer. That is, by forming the liquid crystal layer 16 on the photo-alignment film 14 as shown in FIG. 5, peeling off the formed liquid crystal layer 16 as shown in FIG. 6 (performing the peeling step), applying a liquid crystal composition to the photo-alignment film 14 from which the liquid crystal layer 16 is peeled off, and heating and curing the applied liquid crystal composition, a new liquid crystal layer 16b may be formed as shown in FIG. 7. In addition, the formation of the liquid crystal layer and the peeling of the liquid crystal layer may be performed multiple times.

In a case where the liquid crystal layer is peeled off from the interface with the photo-alignment film, the aligning properties of the photo-alignment film deteriorate slightly. On the other hand, as described above, the photo-alignment film formed using the manufacturing method according to the embodiment of the present invention has high aligning properties. Therefore, even in a case where the liquid crystal layer formed on the photo-alignment film is peeled off to use the photo-alignment film again, high aligning properties can be maintained. Therefore, the liquid crystal compound in the liquid crystal layer formed on the photo-alignment film can be appropriately aligned, and a liquid crystal layer having small alignment defects can be formed.

In addition, in a case where the photo-alignment film is used again and the relative humidity in the atmospheric environment of the photo-alignment film is high between the peeling step and the liquid crystal layer forming step, the photo-alignment film is humidified by moisture such that the azo compound is likely to flow, and the alignment pattern may collapse. Therefore, the relative humidity in the atmospheric environment between the peeling step and the liquid crystal layer forming step is preferably 50% or less, more preferably 30% or less, and still more preferably 10% or less.

In addition, it is most preferable that all the steps are performed in an environment having a relative humidity of 50% or less.

A method of peeling the liquid crystal layer is not particularly limited. For example, the liquid crystal layer can be peeled off from the interface with the photo-alignment film by preparing a polymer film to which a pressure sensitive adhesive is applied, bonding the pressure sensitive adhesive layer to the liquid crystal layer, and pulling the pressure sensitive adhesive in a state where the support is immobilized.

The optical element prepared using the manufacturing method according to the embodiment of the present invention may consist of only the liquid crystal layer (the cholesteric liquid crystal layer 16 or the optically-anisotropic layer 18) or may include the photo-alignment film and the support.

In addition, the optical element prepared using the above-described manufacturing method according to the embodiment of the present invention may consist of only the liquid crystal layer (the cholesteric liquid crystal layer 16 or the optically-anisotropic layer 18). However, the present invention is not limited to this configuration. That is, the optical element may include two or more liquid crystal layers.

For example, the optical element prepared using the manufacturing method according to the embodiment of the present invention may include two cholesteric liquid crystal layers including a cholesteric liquid crystal layer that selectively reflects red light and a cholesteric liquid crystal layer that selectively reflects green light, and may include three cholesteric liquid crystal layers including a cholesteric liquid crystal layer that selectively reflects red light, a cholesteric liquid crystal layer that selectively reflects green light, and a cholesteric liquid crystal layer that selectively reflects blue light.

In a case where the optical element includes a plurality of cholesteric liquid crystal layers, it is preferable that all the cholesteric liquid crystal layers are the cholesteric liquid crystal layers 16 prepared using the manufacturing method according to the embodiment of the present invention, and a typical cholesteric liquid crystal layer prepared using a method in the related art may be included.

The optical element prepared using the manufacturing method according to the embodiment of the present invention can be used for various uses where light is reflected at an angle other than the angle of specular reflection, for example, an optical path changing member, a light collecting element, a light diffusing element to a predetermined direction, a diffraction element, or the like in an optical device.

Hereinabove, the method of manufacturing an optical element according to the embodiment of the present invention has been described above. However, the present invention is not limited to the above-described examples, and various improvements and modifications can be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Example 1

(Formation of Photo-Alignment Film)

A glass substrate was used as the support.

The following coating liquid for forming a photo-alignment film was applied to the support using a spin coater at 2500 rpm for 30 seconds (application step). The support on which the coating film of the coating liquid for forming a photo-alignment film was formed was dried using a hot plate at 60° C. for 60 seconds (drying step). As a result, a photo-alignment film was formed.

Coating Liquid for Forming Photo-Alignment Film

| | |
|---|---|
| The following material for photo-alignment | 1.00 part by mass |
| Water | 16.00 parts by mass |
| Butoxyethanol | 42.00 parts by mass |
| Propylene glycol monomethyl ether | 42.00 parts by mass |

—Material for Photo-Alignment—

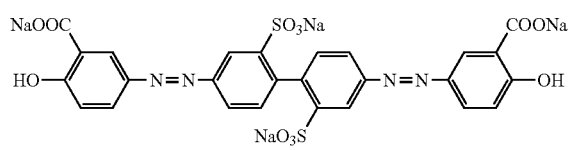

(Exposure of Photo-Alignment Film (Exposure Step))

In an environment having a temperature of 25° C. and a relative humidity of 10%, the photo-alignment film was exposed using the exposure device shown in FIG. 4 to form a photo-alignment film P-1 having an alignment pattern.

In the exposure device, a laser that emits laser light having a wavelength (325 nm) was used as the laser. The exposure dose of the interference light was 3000 mJ/cm$^2$. The intersecting angle (intersecting angle α) between two laser beams was 61.0°.

(Formation of Cholesteric Liquid Crystal Layer (Liquid Crystal Layer Forming Step))

As the liquid crystal composition forming the cholesteric liquid crystal layer, the following liquid crystal composition LC-1 was prepared. The concentration of solid contents in the liquid crystal composition LC-1 was 35 wt %.

Liquid Crystal Composition LC-1

| | |
|---|---|
| Liquid crystal compound L-1 | 100.00 parts by mass |
| Polymerization initiator I-1 | 3.00 parts by mass |
| Chiral agent Ch-1 | 6.20 parts by mass |
| Methyl ethyl ketone | 202.99 parts by mass |

Liquid Crystal Compound L-1

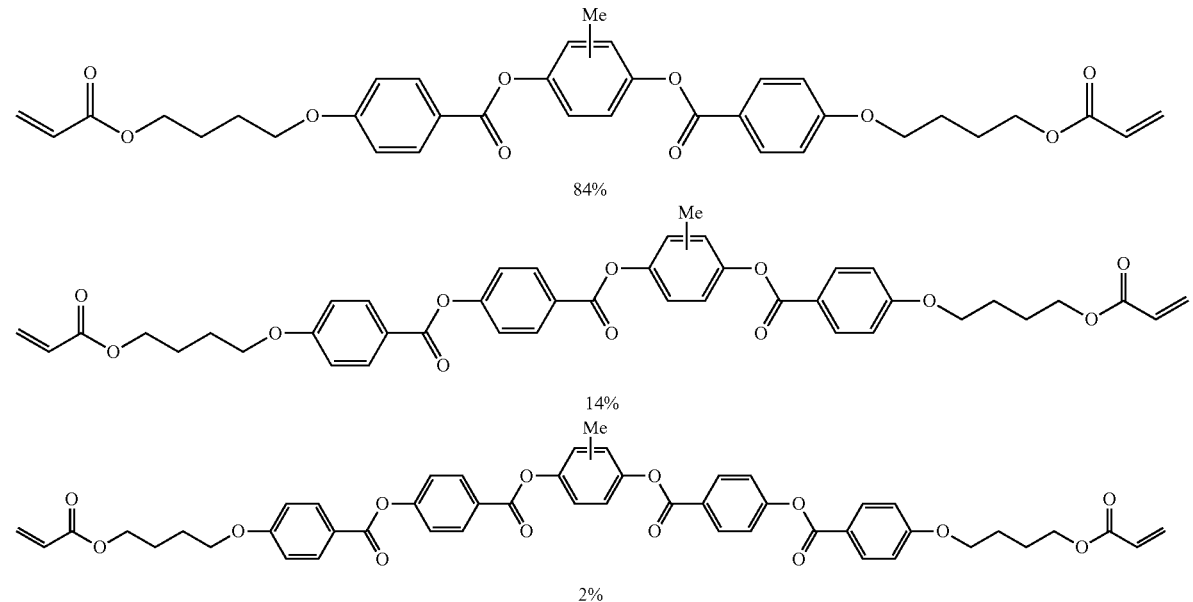

Polymerization Initiator I-1

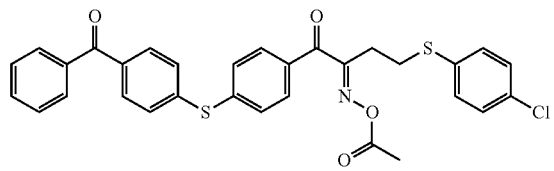 [SMILES: CC(=O)O/N=C(\CCSc1ccc(Cl)cc1)C(=O)c1ccc(Sc2ccc(C(=O)c3ccccc3)cc2)cc1]

Chiral Agent Ch-1

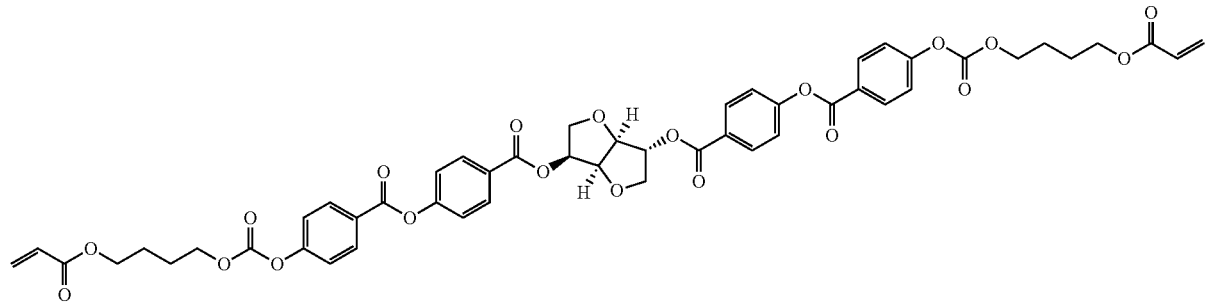 [SMILES: C=CC(=O)OCCCCOC(=O)Oc1ccc(C(=O)Oc2ccc(C(=O)O[C@H]3CO[C@@H]4[C@H]3OC[C@H]4OC(=O)c3ccc(OC(=O)c4ccc(OC(=O)OCCCCOC(=O)C=C)cc4)cc3)cc2)cc1]

In an environment between the exposure step and the liquid crystal layer forming step where the environment was 25° C. and the relative humidity was 10%, the cholesteric liquid crystal layer was formed as follows.

The above-described liquid crystal composition LC-1 was applied to the photo-alignment film P-1 using a spin coater at 1000 rpm for 10 seconds (application step).

The coating film of the liquid crystal composition LC-1 was heated on a hot plate at 80° C. for 3 minutes (180 sec) (heating step).

Next, the coating film was irradiated with ultraviolet light having a wavelength of 365 nm at 80° C. at an irradiation dose of 500 mJ/cm$^2$ using a high-pressure mercury lamp in a nitrogen atmosphere (second exposure step). As a result, the liquid crystal composition LC-1 was cured, the alignment of the liquid crystal compound was immobilized, and a cholesteric liquid crystal layer was formed.

Thus, an optical element including the support, the photo-alignment film, and the cholesteric liquid crystal layer was prepared.

It was verified using a polarization microscope that the cholesteric liquid crystal layer had a periodically aligned surface as shown in FIG. 2.

The optical element was cut in a direction along the rotation direction of the optical axis, and a cross-section was observed with a SEM. By analyzing the SEM image, the single period Λ of the liquid crystal alignment pattern was measured. The single period Λ was 0.32 μm.

Example 2

An optical element was prepared using the same method as that of Example 1, except that the liquid crystal layer forming step was performed after standing an environment having a temperature of 25° C. and a relative humidity of 60% for 24 hours after the exposure step.

Example 3

An optical element was prepared using the same method as that of Example 1, except that the environment was 25° C. and the relative humidity was 30% in the environment between the exposure step and the liquid crystal layer forming step.

Example 4

An optical element was prepared using the same method as that of Example 1, except that the environment was 25° C. and the relative humidity was 50% in the environment between the exposure step and the liquid crystal layer forming step.

Comparative Example 1

An optical element was prepared using the same method as that of Example 1, except that the environment was 25° C. and the relative humidity was 65% in the environment between the exposure step and the liquid crystal layer forming step.

Example 5

The cholesteric liquid crystal layer in the optical element prepared in Example 1 was peeled off from an interface with the photo-alignment film (peeling step). The peeling of the cholesteric liquid crystal layer was performed by bonding a tape to the cholesteric liquid crystal layer and pulling the tape in a direction perpendicular to the surface.

The liquid crystal composition LC-1 was applied to the photo-alignment film from which the cholesteric liquid crystal layer was peeled off, and was heated and exposed (by performing the liquid crystal layer forming step) to prepare a cholesteric liquid crystal layer. The liquid crystal layer forming step was performed using the same method as that of Example 1.

The environment was 25° C. and the relative humidity was 10% in the environment between the peeling step and the liquid crystal layer forming step.

Example 6

The cholesteric liquid crystal layer in the optical element prepared in Example 3 was peeled off from an interface with the photo-alignment film (peeling step). The peeling of the cholesteric liquid crystal layer was performed by bonding a tape to the cholesteric liquid crystal layer and pulling the tape in a direction perpendicular to the surface.

The liquid crystal composition LC-1 was applied to the photo-alignment film from which the cholesteric liquid crystal layer was peeled off, and was heated and exposed (by performing the liquid crystal layer forming step) to prepare a cholesteric liquid crystal layer. The liquid crystal layer forming step was performed using the same method as that of Example 1.

The environment was 25° C. and the relative humidity was 50% in the environment between the peeling step and the liquid crystal layer forming step.

Example 7

The cholesteric liquid crystal layer in the optical element prepared in Example 1 was peeled off from an interface with the photo-alignment film (peeling step). The peeling of the cholesteric liquid crystal layer was performed by bonding a tape to the cholesteric liquid crystal layer and pulling the tape in a direction perpendicular to the surface.

The liquid crystal composition LC-1 was applied to the photo-alignment film from which the cholesteric liquid crystal layer was peeled off, and was heated and exposed (by performing the liquid crystal layer forming step) to prepare a cholesteric liquid crystal layer. The liquid crystal layer forming step was performed using the same method as that of Example 1.

The environment was 25° C. and the relative humidity was 65% in the environment between the peeling step and the liquid crystal layer forming step.

[Evaluation]

Each of a center portion and an outer peripheral portion in a region where the alignment film was exposed in the cholesteric liquid crystal layer of the prepared optical element was observed with a cross-sectional SEM, whether or not alignment defects were observed were evaluated based on the following standards.

A: alignment defects were not observed.
B: alignment defects were slightly observed in the outer peripheral portion.
C: many alignment defects were observed over the entire surface.

The results are shown in Tables 1 and 2.

TABLE 1

| | Humidity in Exposure Step | Humidity between Exposure Step and Liquid Crystal Layer Forming Step | Evaluation Alignment Defects |
|---|---|---|---|
| Example 1 | 10% | 10% | A |
| Example 2 | 10% | 60% | B |
| Example 3 | 30% | 30% | A |
| Example 4 | 50% | 50% | B |
| Comparative Example 1 | 65% | 65% | C |

TABLE 2

| | Humidity in Exposure Step | Humidity between Exposure Step and Liquid Crystal Layer Forming Step | Humidity between Peeling Step and Liquid Crystal Layer Forming Step | Evaluation Alignment Defects |
|---|---|---|---|---|
| Example 5 | 10% | 10% | 10% | A |
| Example 6 | 50% | 50% | 50% | B |
| Example 7 | 10% | 10% | 65% | B |

It can be seen from Table 1 that, in Examples of the present invention where the exposure step was performed in the environment having a relative humidity of 50% or less, a liquid crystal layer having small alignment defects was able to be prepared as compared to Comparative Examples.

In addition, it can be seen from a comparison between Examples 1 and 2 that the relative humidity in the environment between the exposure step and the liquid crystal layer forming step was preferably 50% or less.

In addition, it can be seen from a comparison between Examples 3 and 4 that the relative humidity in the environment during the exposure step was preferably 30% or less.

It can be seen from Table 2 that, in the present invention, a liquid crystal layer having small alignment defects can be prepared even in a case where the photo-alignment film was used again.

In addition, it can be seen from a comparison between Examples 5 and 7 that, in a case where the photo-alignment film was used again, the relative humidity in the environment between the liquid crystal layer peeling step and the liquid crystal layer forming step was preferably 50% or less.

As can be seen from the above results, the effects of the present invention are obvious.

The present invention is suitably applicable to various uses where light is diffracted in an optical device, for example, a diffraction element that causes light to be incident into a light guide plate of AR glasses or emits light to the light guide plate.

EXPLANATION OF REFERENCES

10: optical element
12: support
14: photo-alignment film
16, 16b: cholesteric liquid crystal layer
40: liquid crystal compound
40A: optical axis
60: exposure device
62: laser
64: light source
65: $\lambda/2$ plate
68: polarization beam splitter
70a, 70B: mirror
72A, 72B: $\lambda/4$ plate
R: right circularly polarized light
M: laser light
MA, MB: beam
$P_O$: linearly polarized light
$P_R$: right circularly polarized light
$P_L$: left circularly polarized light
P: helical pitch
Λ: single period of liquid crystal alignment pattern

What is claimed is:

1. A method of manufacturing an optical element, the method comprising:
   an exposure step of performing interference exposure to a surface of a photo-alignment film including a photo-alignment material to form, on the photo-alignment film, an alignment pattern in which a direction of an optical axis derived from a liquid crystal compound changes while continuously rotating in at least one in-plane direction;
   a liquid crystal layer forming step of applying a liquid crystal composition including a liquid crystal compound to the photo-alignment film where the alignment pattern is formed to form a liquid crystal layer; and
   a peeling step of peeling off the liquid crystal layer formed in the liquid crystal layer forming step from the photo-alignment film, wherein the liquid crystal layer is formed by performing the liquid crystal layer forming step again after the peeling step, the photo-alignment material includes an azo compound, the exposure step is performed in an environment having a relative humidity of 50% or less, and a relative humidity in an atmospheric environment between the peeling step and the liquid crystal layer forming step is 10% or less.

2. The method of manufacturing an optical element according to claim 1, wherein a relative humidity in an atmospheric environment between the exposure step and the liquid crystal layer forming step is 50% or less.

* * * * *